United States Patent [19]

Tran et al.

[11] Patent Number: 5,530,700
[45] Date of Patent: Jun. 25, 1996

[54] METHOD AND DEVICE FOR CONTROLLING TIME SLOT CONTENTION TO PROVIDE FAIRNESS BETWEEN A PLURALITY OF TYPES OF SUBSCRIBER UNITS IN A COMMUNICATION SYSTEM

[75] Inventors: Phieu M. Tran, Lincolnwood; Jeffrey C. Smolinske, Hoffman Estates; Robert C. Scheibel, Jr., Schaumburg; Christopher L. Clanton, Chicago, all of Ill.

[73] Assignee: Motorola, Inc., Schaumburg, Ill.

[21] Appl. No.: 282,242

[22] Filed: Jul. 29, 1994

[51] Int. Cl.⁶ .................................................. H04B 7/204
[52] U.S. Cl. .................... 370/79; 370/85.2; 370/95.1; 379/59; 379/63; 455/54.1; 455/56.1
[58] Field of Search .................... 370/79, 84, 85.2, 370/95.1, 95.3, 85.7; 379/58, 59, 63; 455/54.1, 56.1

[56] References Cited

U.S. PATENT DOCUMENTS

| | | | |
|---|---|---|---|
| 4,400,585 | 8/1983 | Kaman et al. | 455/54.1 X |
| 5,121,387 | 6/1992 | Gerhardt et al. | 370/85.2 |
| 5,124,985 | 6/1992 | Hoshikawa | 370/95.3 |
| 5,142,533 | 8/1992 | Crisler et al. | 370/95.1 |
| 5,276,911 | 1/1994 | Levine et al. | 455/54.1 X |

OTHER PUBLICATIONS

"Baseline Text For Tag 3(PACS)", Motorola, Inc. Contact C. Stephen Hawkins, Feb. 2, 1995, Joint Technical Committee (JTC).

Man–Keung Lo & Tak–Shing Yum, "The Tone Sense Multiaccess Protocol with Paratial Collision Detection (TMSA/PCD) for Packet Satellite Communications", IEEE Transactions on Communications, vol. 41, No. 6, Jun. 1993, pp. 820–824.

Bernd–Peter Paris & Behnaam Aazhang, "Near–Optimum Control of Multiple–Acess Collision Channels", IEEE Transactions on Comunications, vol. 40, No. 8, Aug. 1992, pp. 1298–1309.

Duei Tsai & Jin–Fu Chang, "A Hybrid Contention–Based TDMA Technique for Data Transmission", IEEE Transactions on Communications, vol. 36, No. 2, Feb./1988, pp. 225–228.

Rashid Al–Naami & Debabrata Saha, "Status Sense Multiple–Access ($S^2MA$) Communication", IEEE Transactions on Communications, vol. 40, No. 6, Jun. 1992, pp. 996–1002.

P. Papantoni–Kazakos, "Multiple–Access Algorithms for a System with Mixed Traffic: High and Low Priority", IEEE Transactions on Communications, vol. 40, No. 3, Mar. 1992, pp. 541–555.

George Thomas, "Application of Multiuser Coding to Random Access Protocols", IEEE Transactions on Communications, vol. 36, No. 8, Aug. 1988, pp. 983–986.

Shivendra Panwar, Don Towsley, & Yehuda Armoni, "Collision Resolution Algorithms for a Time–Constrained Multiaccess Channel", IEEE Transactions on Communications, vol. 41, No. 7, Jul. 1993, pp. 1023–1026.

Douglas Browning & John Thomas, "Optimal Coding Schemes for Conflict–Free Channel Access", IEEE Transactions on Communications, vol. 37, No. 10, Oct. 1989, pp. 1004–1013.

Shuji Tasaka & Kenichi Ishida, "The SRUC Protocol for Satellite Packet Communication—A Performance Analysis", IEEE Transactions on Communications, vol. COM–34, No. 9, Sep. 1986, pp. 937–945.

Cellular System Dual–Mode Mobile Station–Base Station Compatibility Standard, EIA/TIA /IS–54–A, pp. 178–179, Mar. 1991.

*Primary Examiner*—Douglas W. Olms
*Assistant Examiner*—Russell W. Blum
*Attorney, Agent, or Firm*—Darleen J. Stockley

[57] ABSTRACT

The present invention provides a unique access control scheme for assigning a plurality of time slots in a fair manner among subscriber units using a single time slot in a frame and subscriber units using multiple time slots in a frame in a communication system.

9 Claims, 16 Drawing Sheets

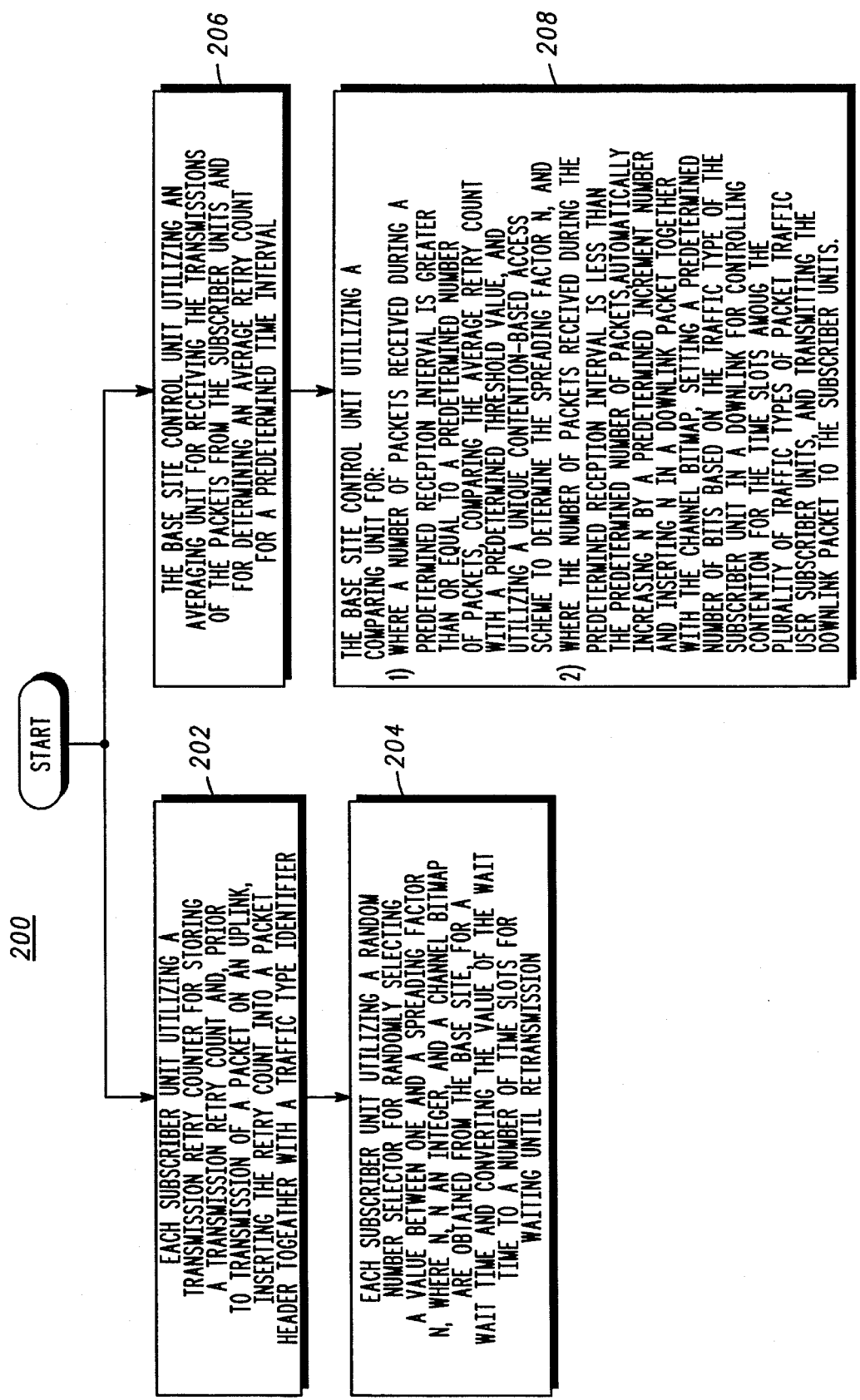

METHOD AND DEVICE FOR CONTROLLING TIME SLOT CONTENTION TO PROVIDE FAIRNESS BETWEEN A PLURALITY OF TYPES OF SUBSCRIBER UNITS IN A COMMUNICATION SYSTEM

FIELD OF THE INVENTION

The present invention relates generally to control of time slot usage in a communication system and, more particularly, to control of time slot contention for fairness in a communication system.

BACKGROUND

In time-division multiple access (TDMA) communication systems, each frame is an interval of T seconds, and each frame is divided into n discrete time slots. Thus, subscriber units can communicate with each other on a basis of non-overlapping transmission bursts. Since there is no overlap, a same carrier frequency may be assigned to all subscriber units using a same base site.

The TDMA technique is characterized by duration of the time frame and the time slot within the frame. Each time slot typically consists of a guard time, a preamble, and the information to be transmitted. Typically, the preamble contains system information such as synchronization, control and routing information. The guard time and the preamble generally depend on the organization of the system. The information to be transmitted occupies a predetermined number of bits.

Generally, any time slot in a frame is available for any subscriber unit. In such a system there is a need for a fair method of simultaneously allocating time slots between users as the number and location of available time slots within a frame changes.

BRIEF DESCRIPTIONS OF THE DRAWINGS

FIG. 2 is a flow chart of one embodiment of the steps of the novel scheme for controlling time slot contention in accordance with the present invention.

Figure 4:
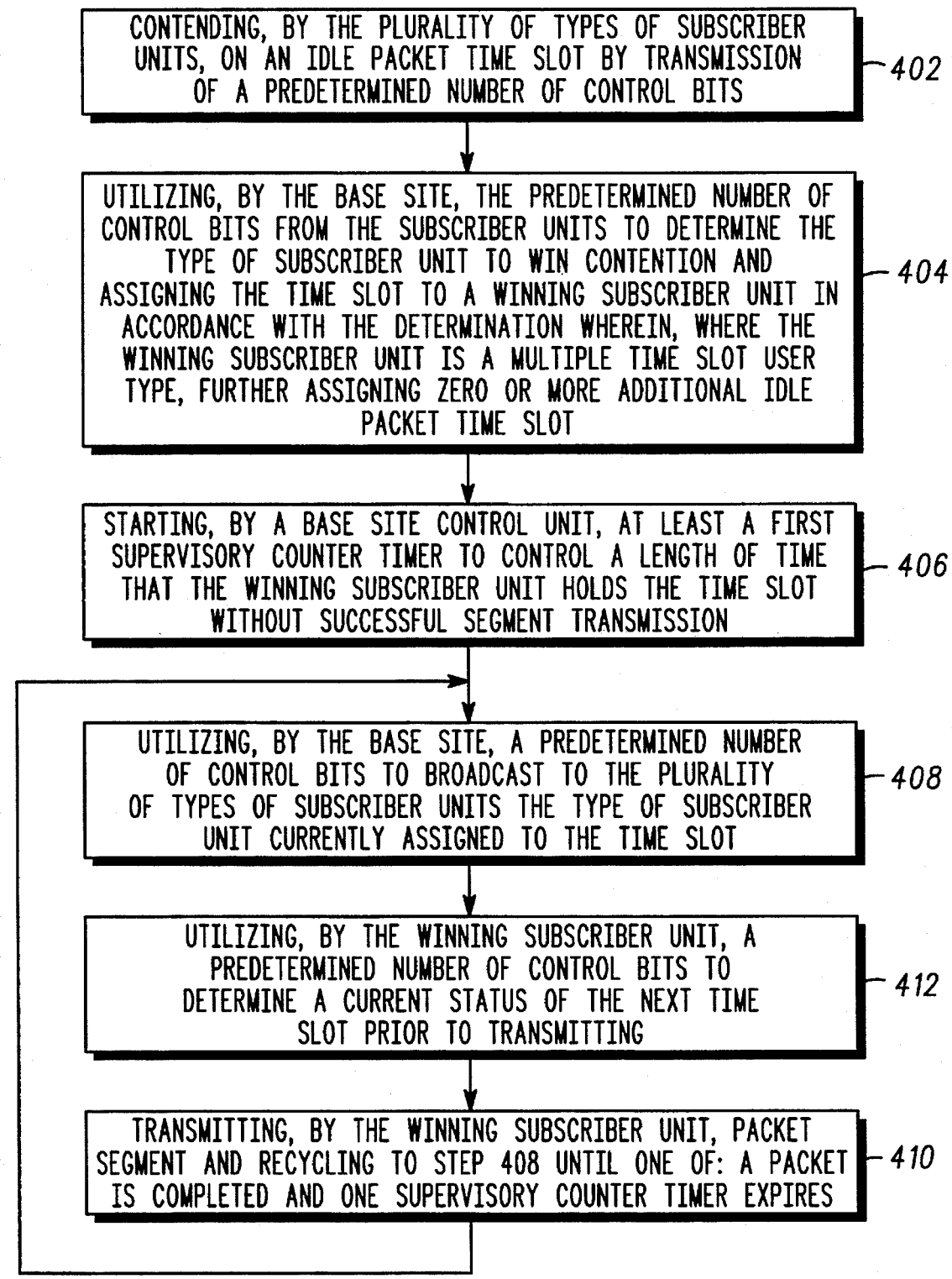
Figure 5:
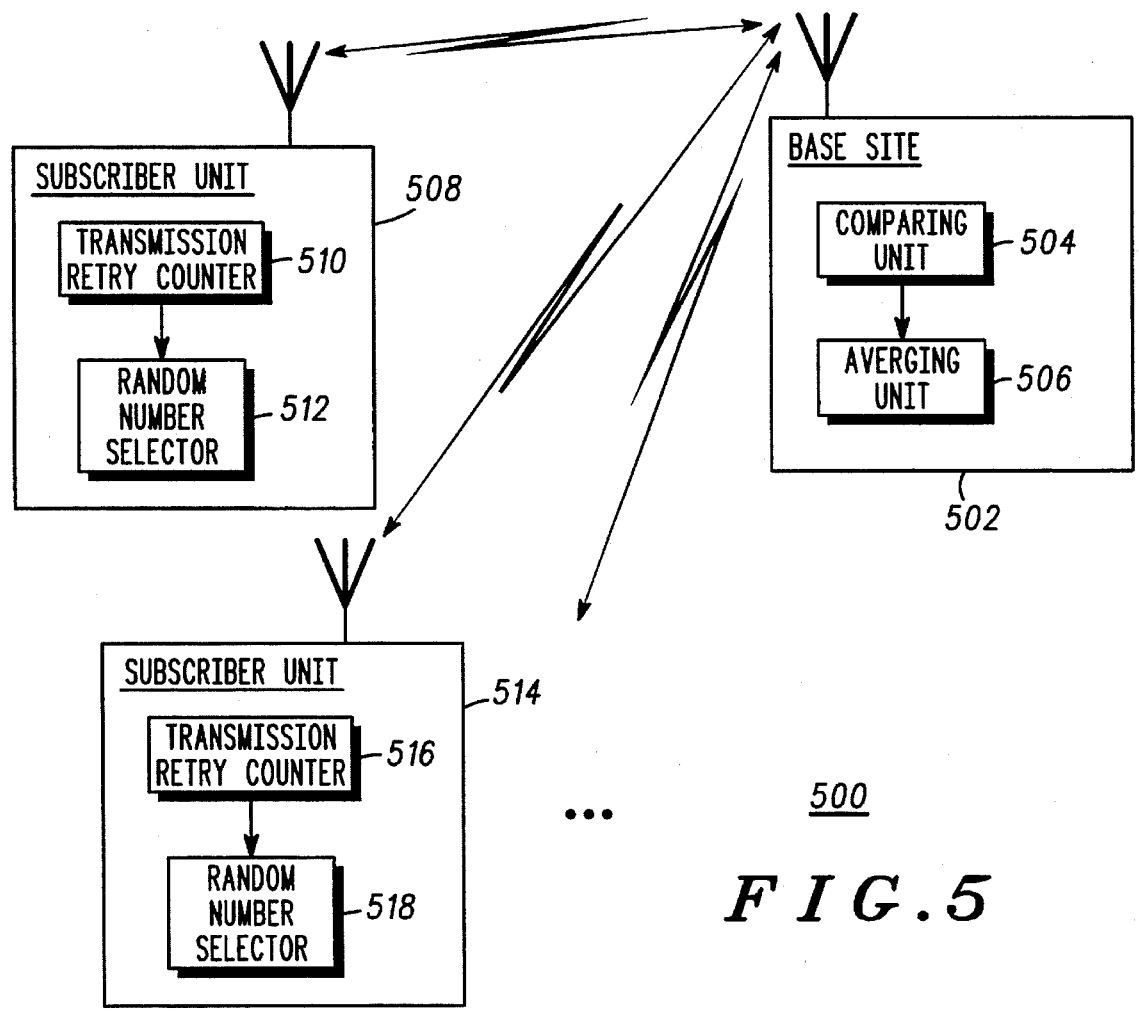

FIG. 4 is a flow chart of another embodiment of steps of a method for controlling time slot contention to provide fairness between a plurality of types of subscriber units communicating with a base site in a time division multiplex communication system in accordance with the present invention FIG. 5 is a block diagram of one embodiment of a time division multiplex communication system for controlling time slot contention to provide fairness among transmissions for a plurality of traffic types of subscriber units in accordance with the present invention.

Figure 6:
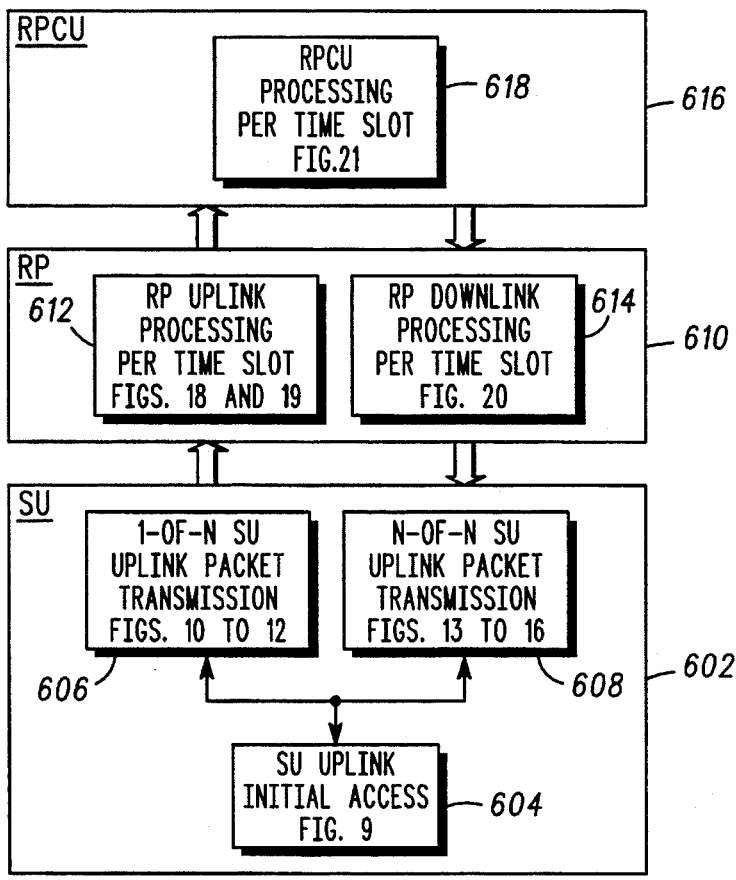

FIG. 6 is a block diagram of one embodiment of a process organization for a radio port/base site in accordance with the present invention wherein the radio port/base site and the radio port control unit/base site control unit are separate units.

Figure 7:
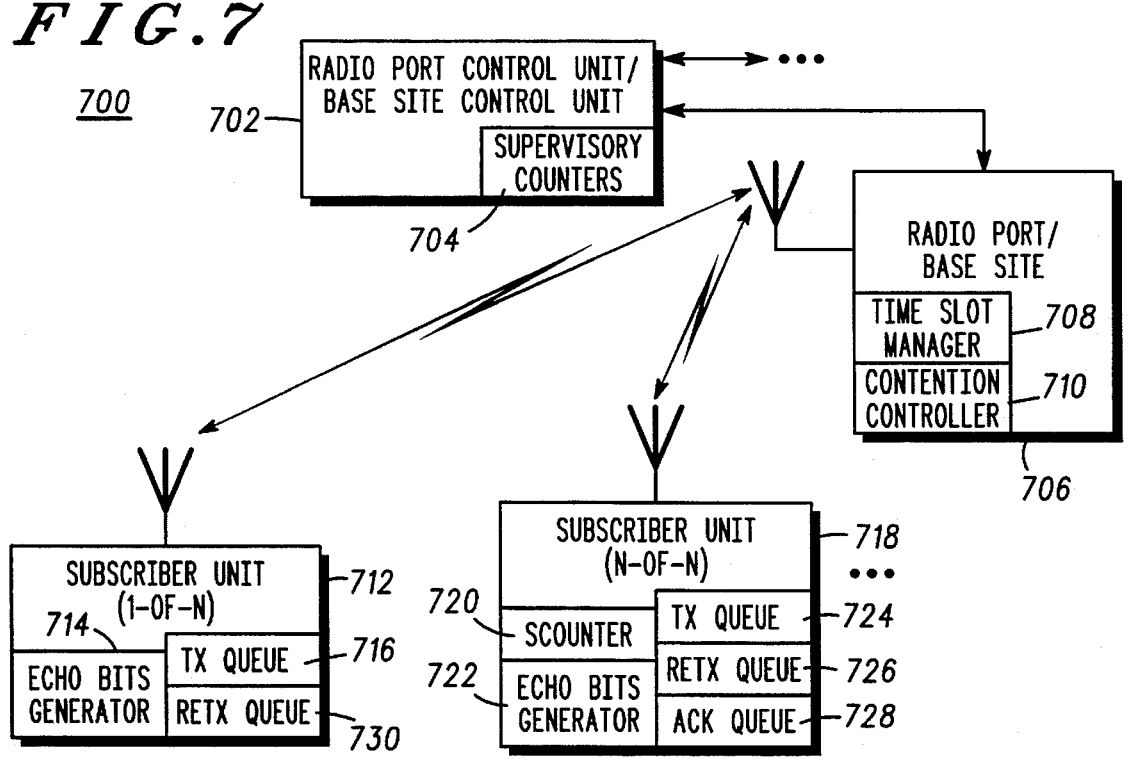

FIG. 7 is a block diagram of a time division multiplex communication system for controlling time slot contention to provide fairness among transmissions for a plurality of traffic types of subscriber units in accordance with the present invention.

Figure 8:
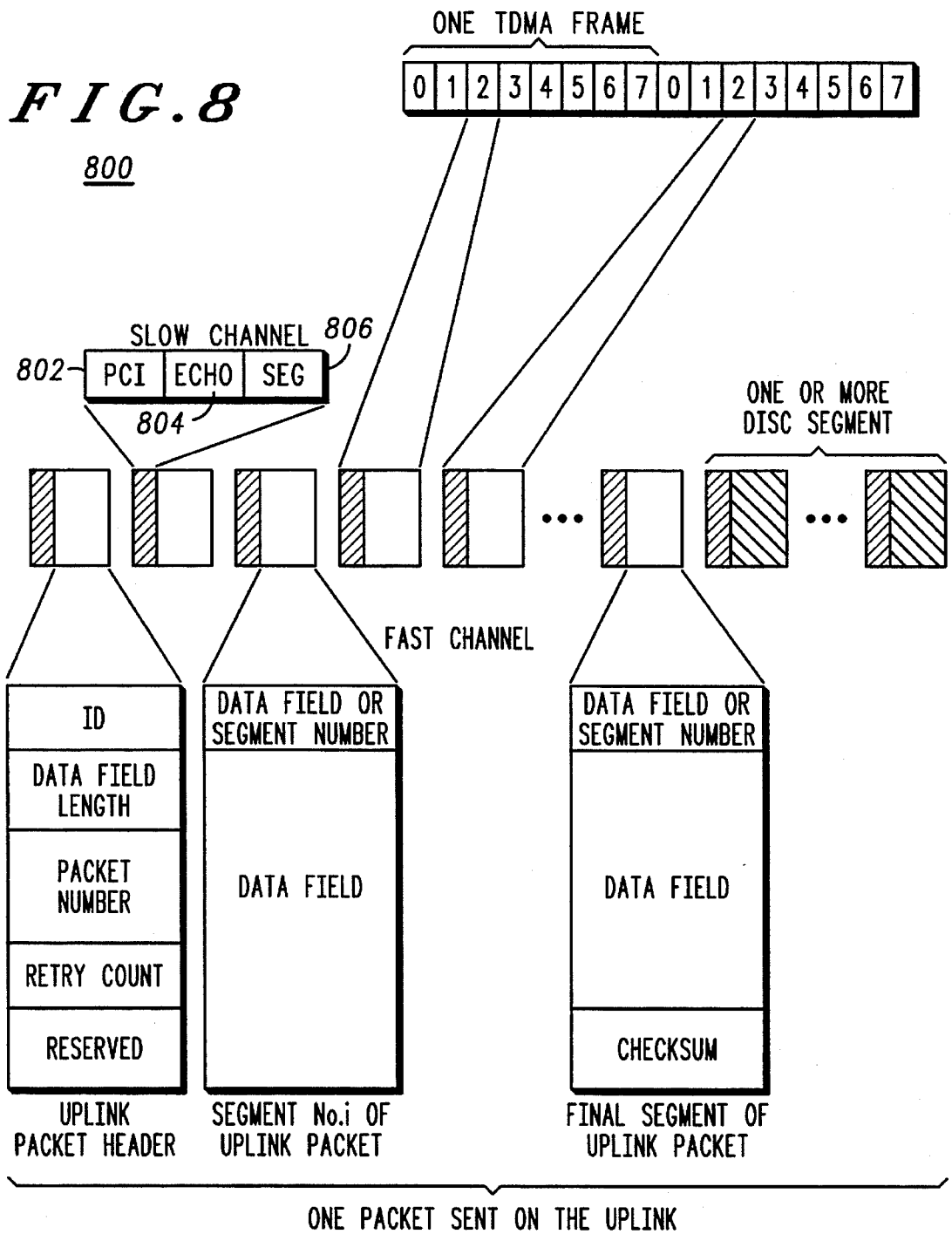

FIG. 8 is a schematic drawing of an exemplary simplified TDMA frame structure that contains 8 time slots and shows a typical uplink packet structure.

Figure 9:
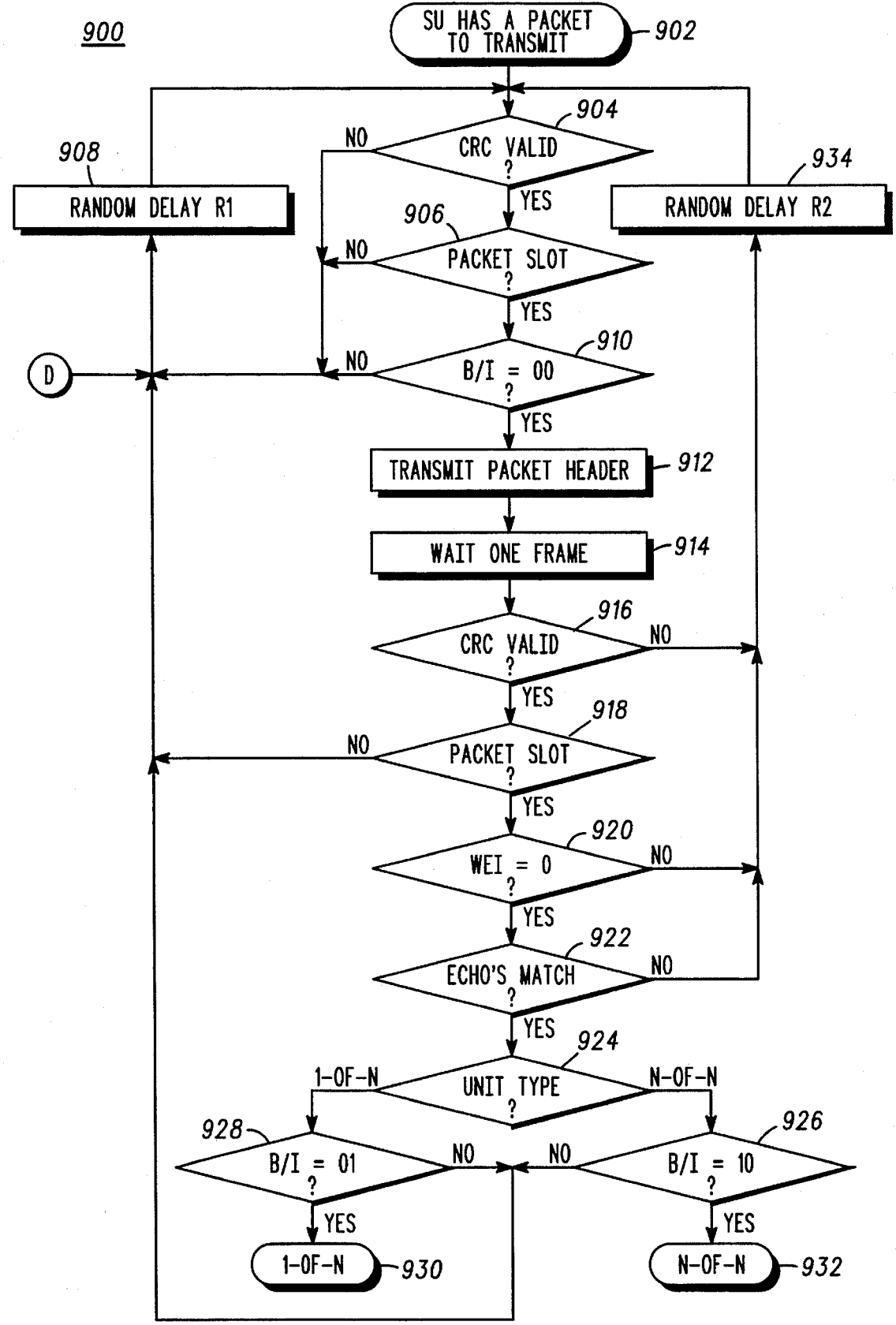

FIG. 9 is a flow chart showing steps for one embodiment of an uplink initial access control scheme executed by a subscriber unit in accordance with the method of the present invention.

Figure 10:
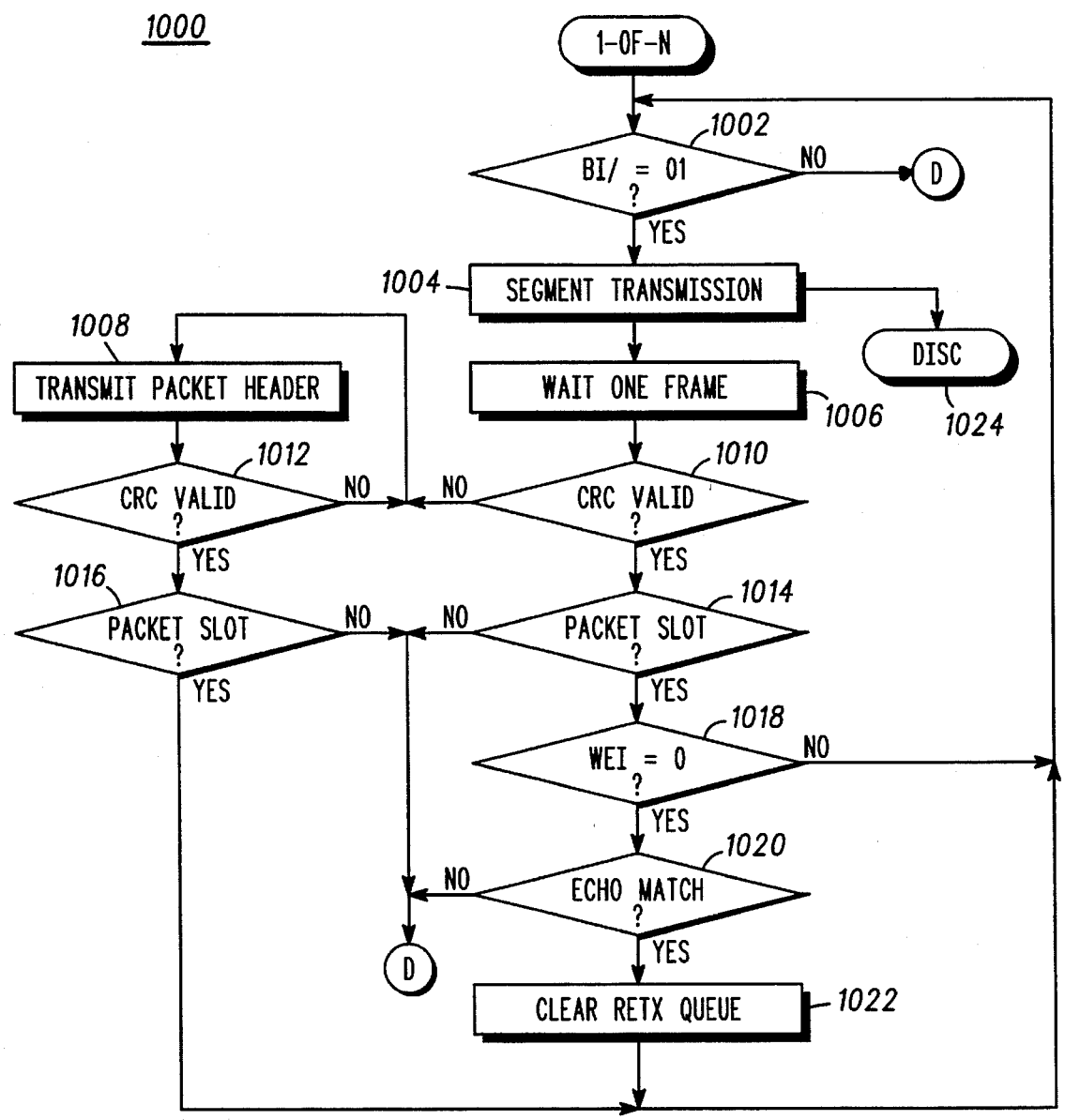
Figure 11:
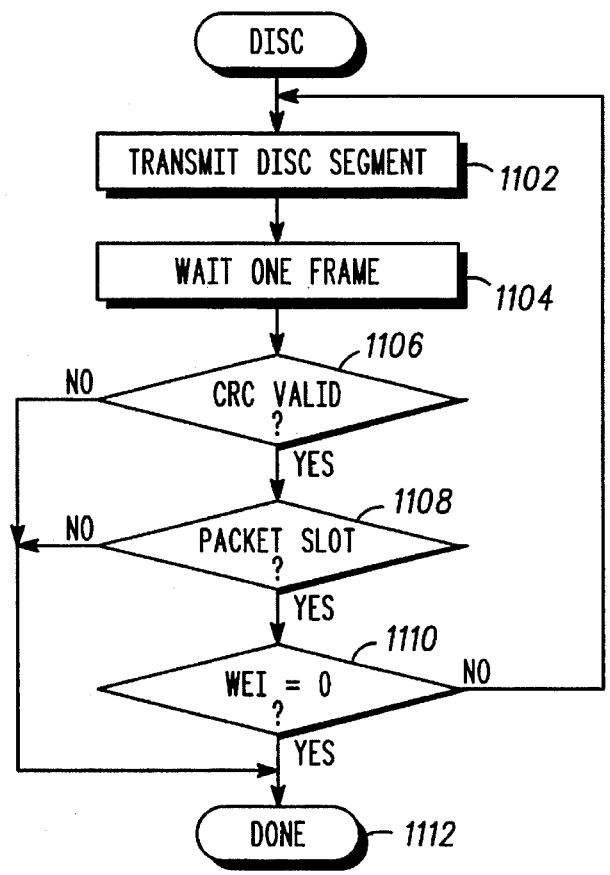
Figure 12:
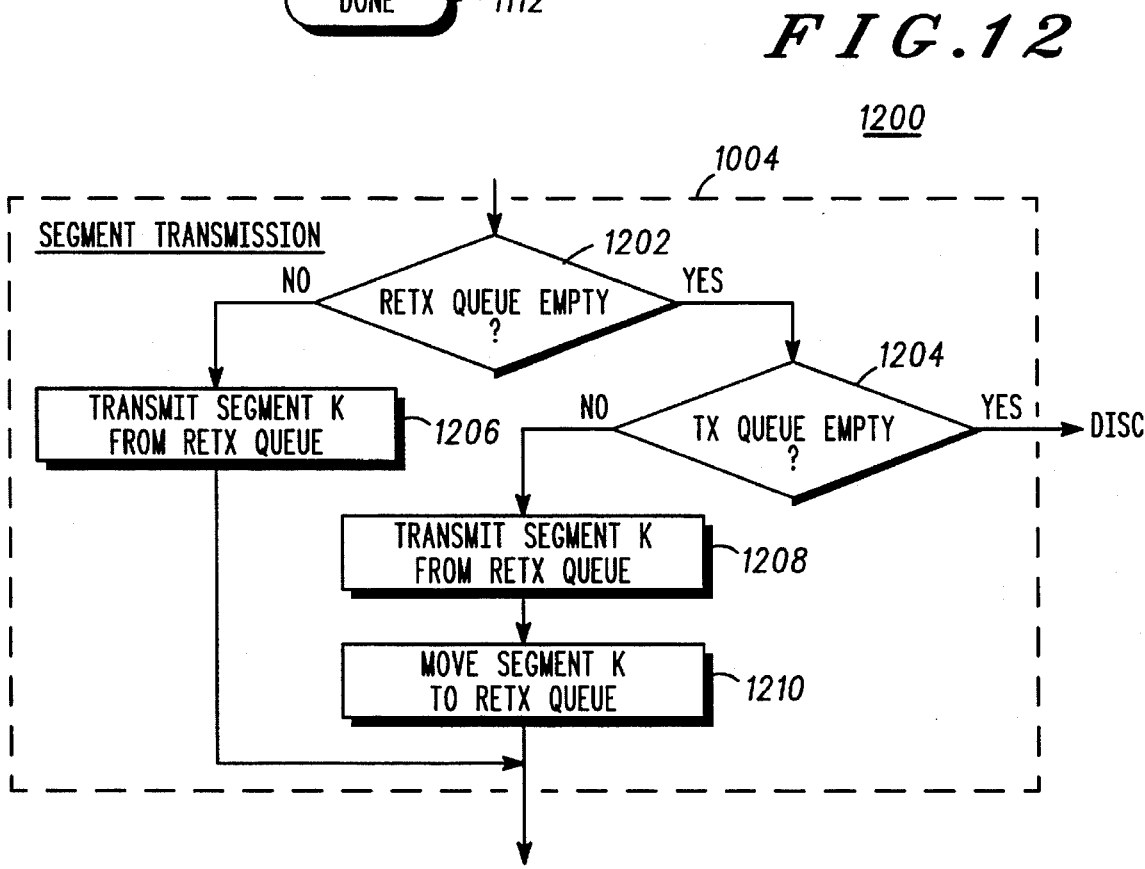
Figure 13:
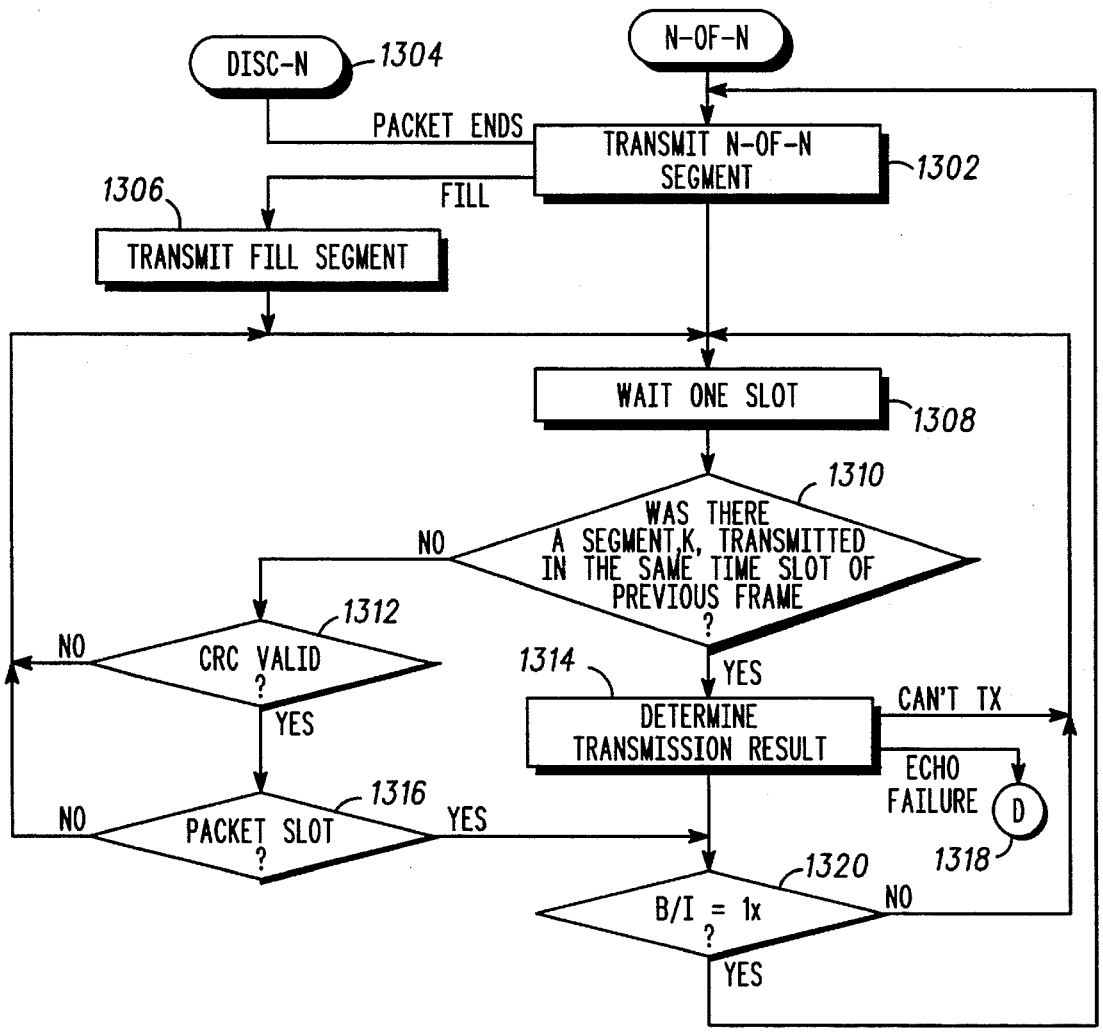

FIGS. 10, 11, and 12 are a flow chart showing steps for one embodiment of an uplink packet transmission scheme executed by a single-slot subscriber unit in accordance with the method of the present invention.

FIGS. 13, 14, 15 and 16 are a flow chart showing steps for one embodiment of an uplink packet transmission scheme executed by the multi-slot subscriber unit in accordance with the method of the present invention.

Figure 17:
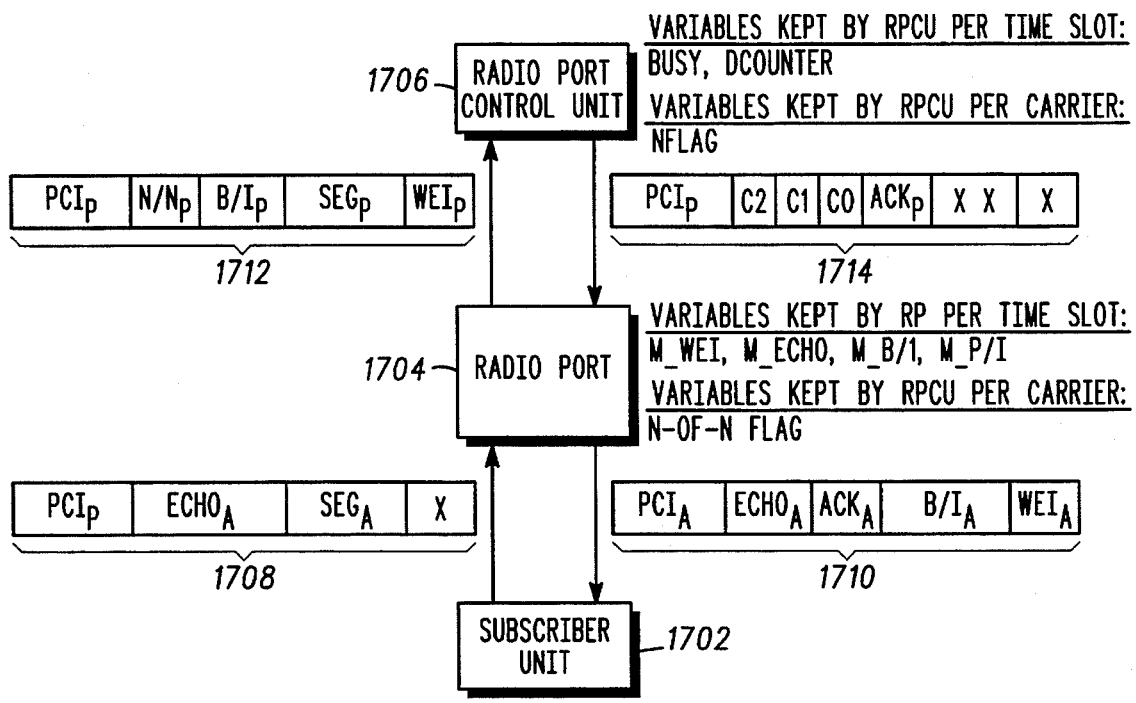

FIG. 17 is a schematic showing, for a block diagram of elements operating in accordance with the present invention, one implementation of slow channel bits and variables exchanged between a subscriber unit, a radio port and a radio port control unit in accordance with the present invention.

Figure 18:
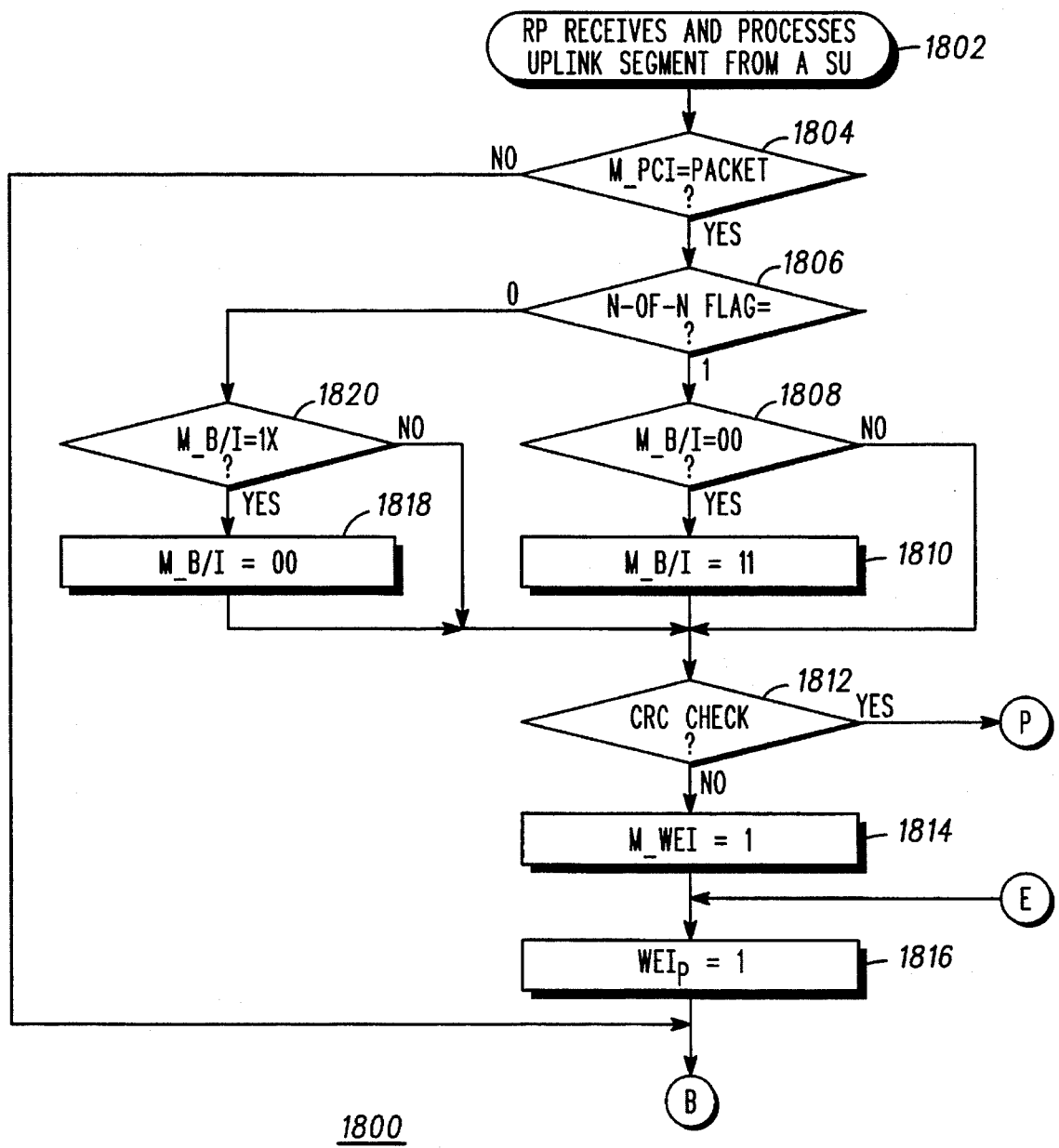
Figure 19:
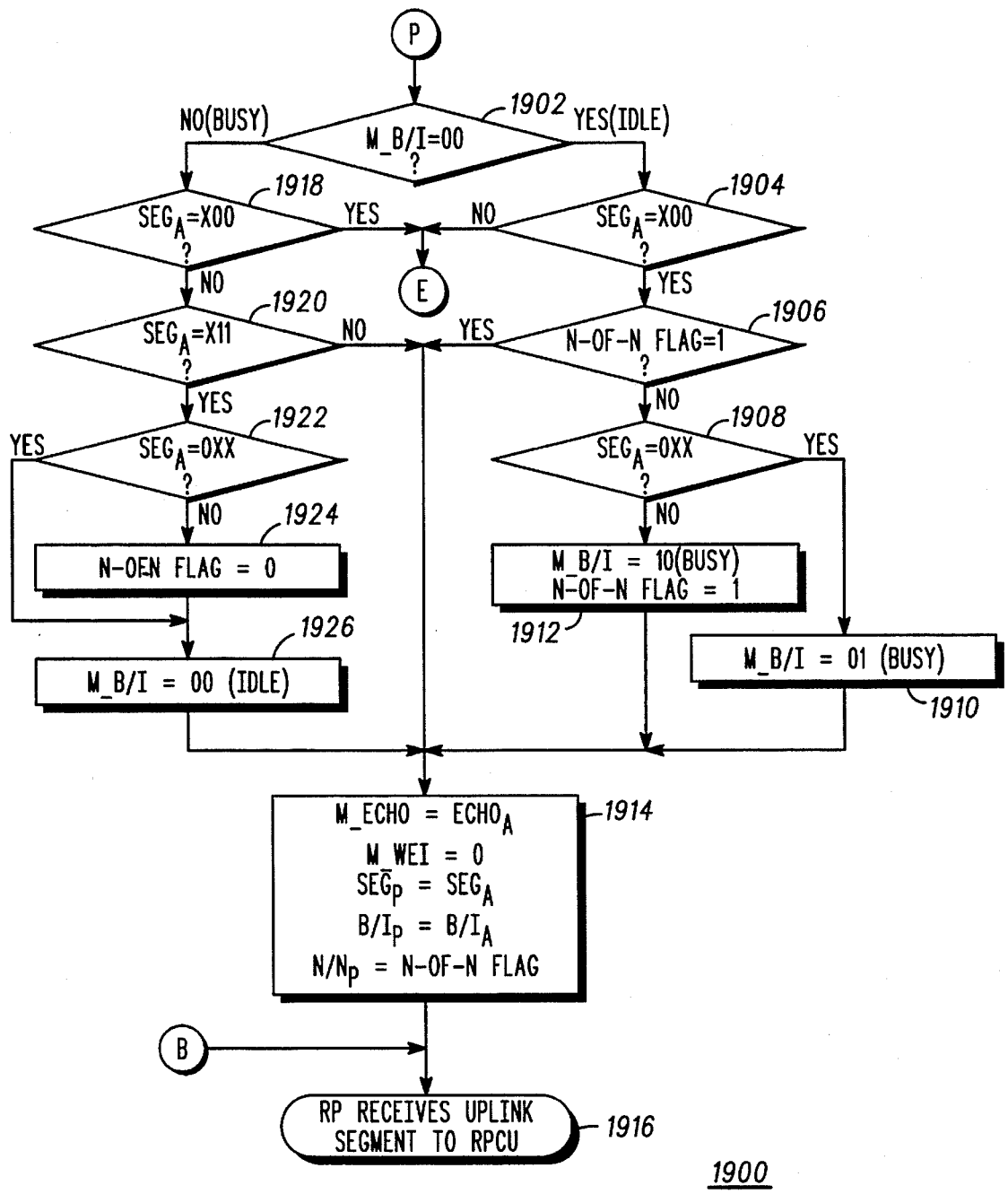

FIGS. 18 and 19 show a flow chart for steps in one embodiment for an uplink processing scheme executed by a radio port in accordance with the method of the present invention.

Figure 20:
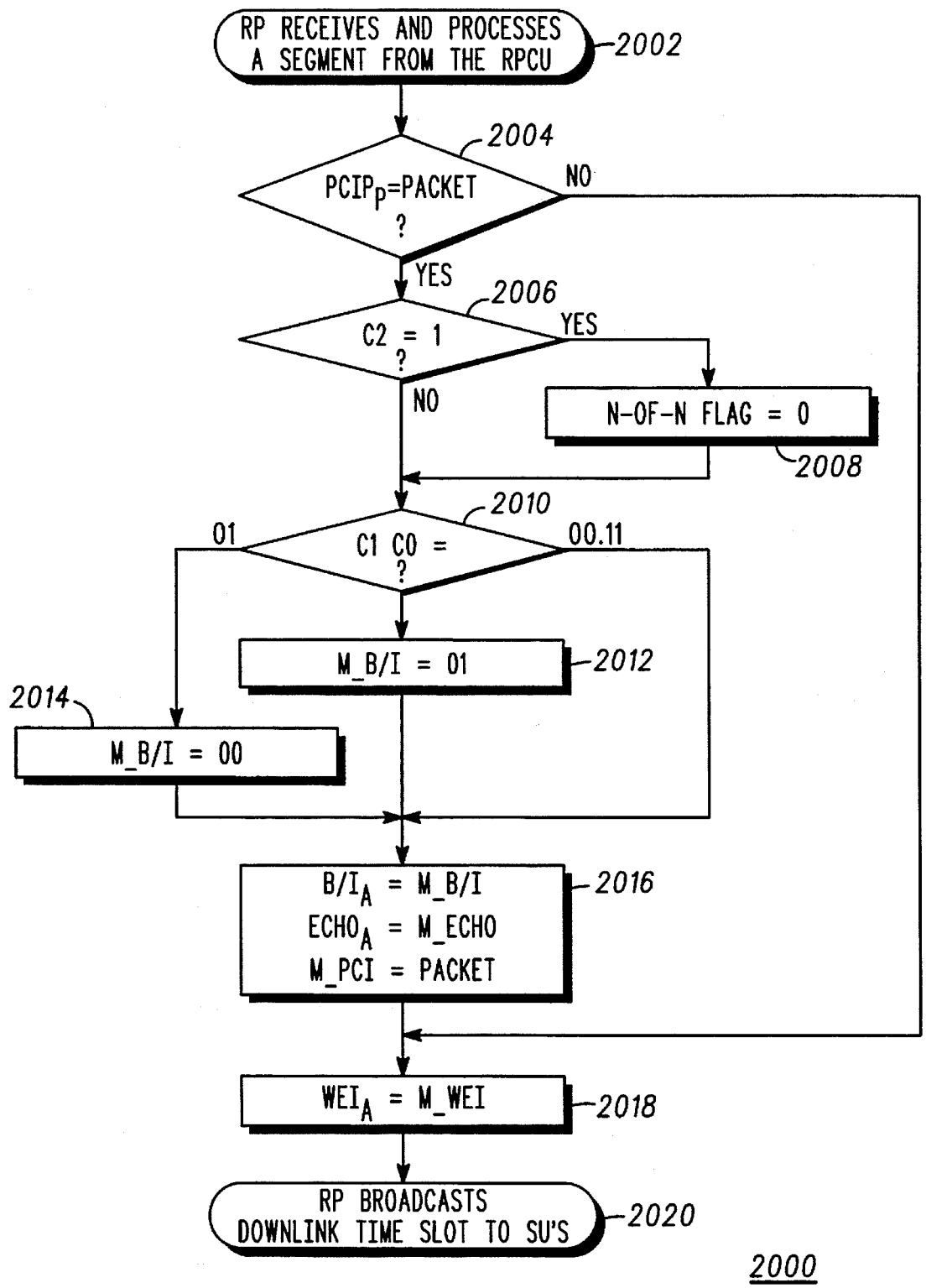

FIG. 20 is a flow chart for one embodiment of a downlink processing scheme executed by a radio port in accordance with the present invention.

Figure 21:
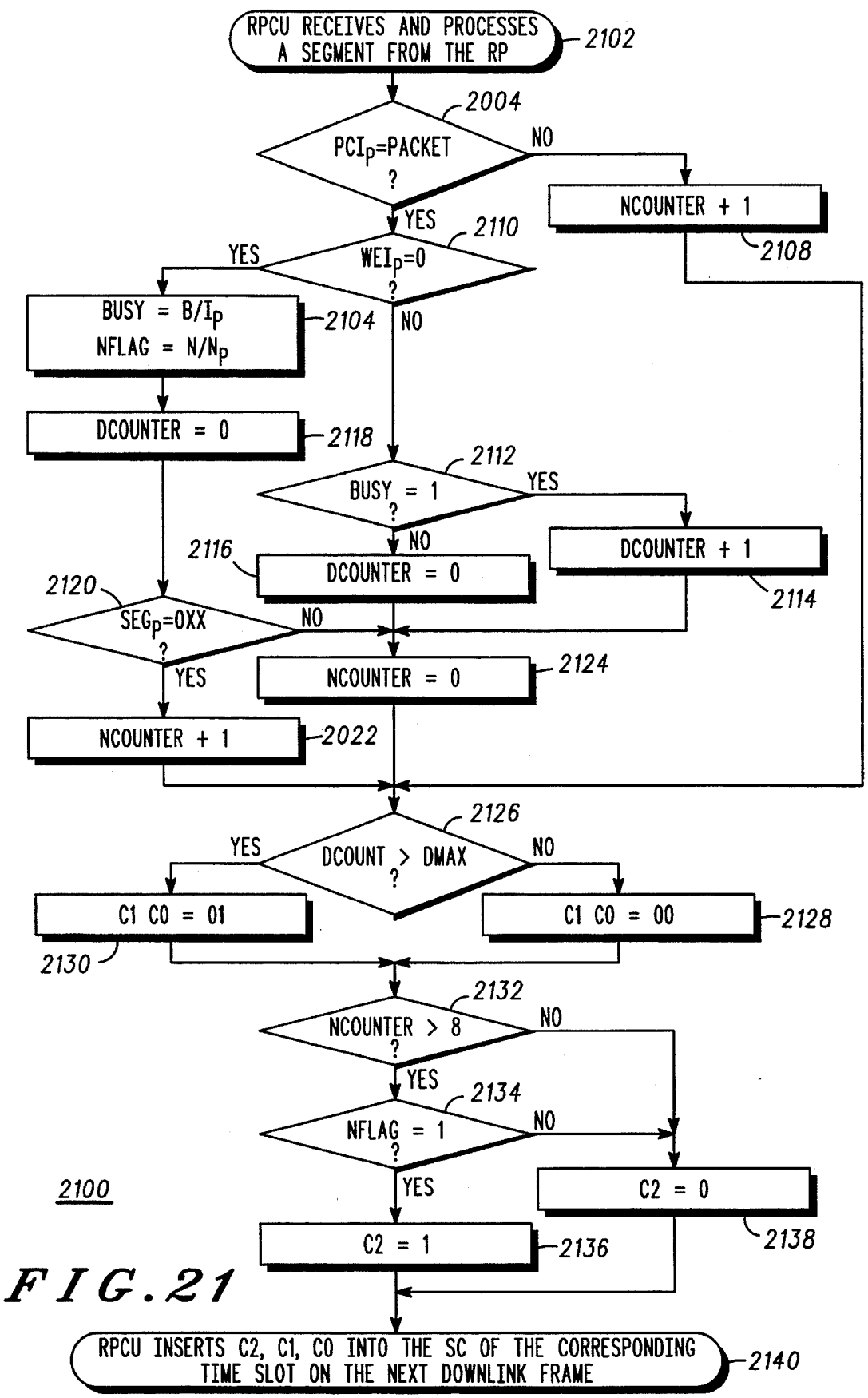

FIG. 21 is a flow chart for one embodiment of an uplink processing scheme executed by a radio port control unit in accordance with the present invention.

DETAILED DESCRIPTION OF A PREFERRED EMBODIMENT

The present invention allows subscriber units using a single time slot in a frame and subscriber units using multiple time slots in the frame to share time slots of a physical channel in a communication system. The invention provides an access protocol that uses a contention scheme for assigning a plurality of time slots in a fair manner among multiple traffic types.

A channel protocol is a procedure by which a group of nameless users contending for a channel all agree on a set of rules for acquiring a transmission channel. Where all users abide by the protocol, the channel is sequentially assigned to subsequent users in an orderly fashion. A collision channel is a channel in which there is a simple central relay or base site in which messages that do not satisfy a predetermined parity check condition are negatively acknowledged with a return to a transmitting user. If one user begins to transmit and another user transmits an overlapping message, a message collision occurs and neither message is intelligible. If both users retransmit, a collision occurs again. Typically, a conflict resolution algorithm is used to determine which user is allowed to transmit first, i.e., to determine a retransmission time for the users such that it is unlikely that their retransmissions will collide. In a slotted channel time is divided into intervals called slots, where the duration of a slot is the same as the duration of a segment of a packet. A segment contains information transmitted during one time slot. Thus, packets can only collide with other packets that are transmitted in a same time slot.

Figure 1:
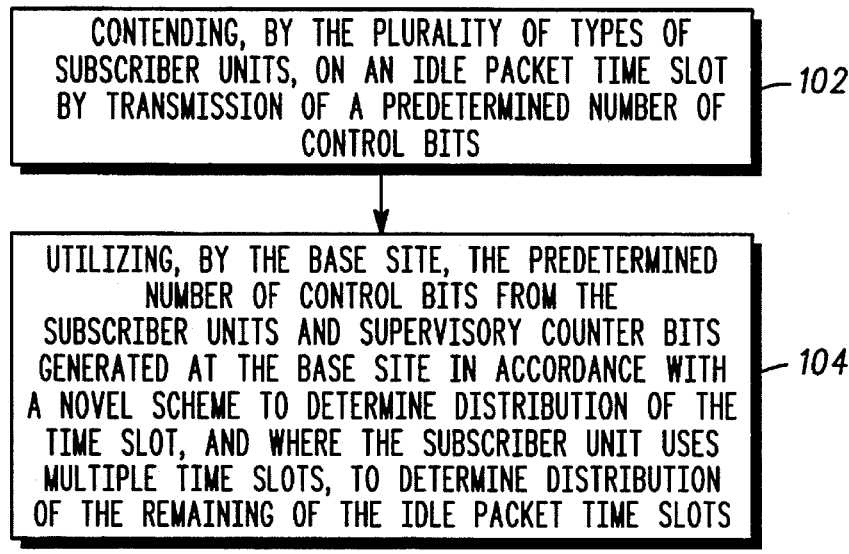
FIG. 1 is a flow chart of steps of a method for utilizing a novel scheme for controlling contention for a plurality of idle time slots to provide fairness between a plurality of types of subscriber units in a time division multiplex communication system in accordance with the present invention.

FIG. 1, numeral 100, is a flow chart of steps of a method for utilizing a novel scheme for controlling, at a base site, contention for a plurality of idle time slots to provide fairness between a plurality of types of subscriber units in a time division multiplex communication system in accordance with the present invention. The method includes the steps of: A) contending, by the plurality of types of subscriber units, on an idle packet time slot by transmission of a predetermined number of control bits (102); and B) utilizing, by the base site, the predetermined number of control bits from the subscriber units and supervisory counter bits generated at the base site in accordance with a novel scheme to determine distribution of the time slot, and where the subscriber unit uses multiple time slots, to determine distribution of remaining idle packet time slots (104).

FIG. 2, numeral 200, is a flow chart of one embodiment of the steps of the novel scheme for controlling time slot contention in accordance with the present invention. The novel scheme utilizes parallel performance by the plurality of subscriber units and the base site. Each subscriber unit performs the steps of: A) utilizing a transmission retry counter for storing a transmission retry count and, prior to transmission of a packet on an uplink, inserting the retry count into a packet header together with a traffic type identifier (202) and B) utilizing a random number selector for randomly selecting a value between one and a spreading factor N, where N, N an integer, and a channel bitmap are obtained from the base site, for a wait time and converting the value of the wait time to a number of time slots for waiting until retransmission (204). Meanwhile, the base site control unit performs the steps of: C) utilizing an averaging unit for receiving the transmissions of the packets from the subscriber units and for determining an average retry count for a predetermined time interval (206) and D) utilizing a comparing unit (208) for: D1) where a number of packets received during a predetermined reception interval is greater than or equal to a predetermined number of packets, comparing the average retry count with a predetermined threshold value, and utilizing a unique contention-based access scheme to determine the spreading factor N, and D2) where the number of packets received during the predetermined reception interval is less than the predetermined number of packets, automatically increasing N by a predetermined increment number and inserting N in a downlink packet together with the channel bitmap, setting a predetermined number of control bits based on the traffic type of the subscriber unit in a downlink for controlling contention for time slots among the plurality of traffic types of packet traffic user subscriber units, and transmitting the downlink packet to the subscriber units.

Figure 3:
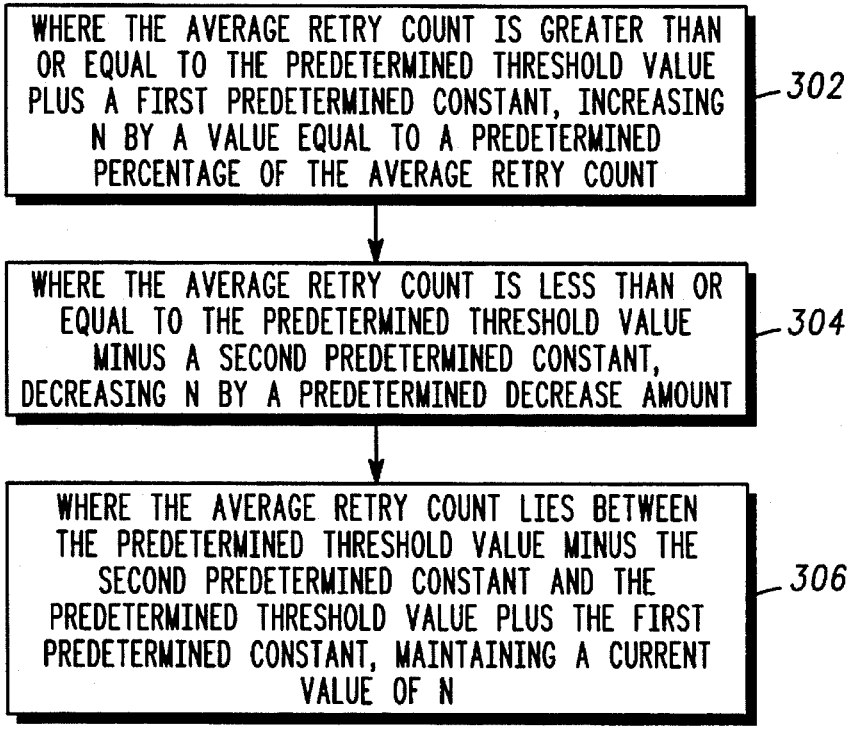
FIG. 3 is a flow chart of one embodiment of the unique contention-based access scheme for determining the spreading factor N in accordance with the present invention.

FIG. 3, numeral 300, is a flow chart of one embodiment of the unique contention-based access scheme for determining the spreading factor N in accordance with the present invention. The scheme typically comprises the steps of: A) where the average retry count is greater than or equal to the predetermined threshold value plus a first predetermined constant, increasing N by a value equal to a predetermined percentage of the average retry count (302); B) where the average retry count is less than or equal to the predetermined threshold value minus a second predetermined constant, decreasing N by a predetermined decrease amount (304); and C) where the average retry count lies between the predetermined threshold value minus the second predetermined constant and the predetermined threshold value plus the first predetermined constant, maintaining a current value of N (306).

In the preferred embodiment, the predetermined number of control bits is two and the control bits indicate four types of ownership of a time slot. In one implementation, the four types of ownership are: A) a current time slot is available for contention requests; B) the current time slot is owned by a single time slot subscriber unit; C) the current time slot is owned by the multiple time slot subscriber unit that sent a channel request in the time slot; and D) the current time slot is owned by a multiple time slot subscriber unit that sent a channel request in a different time slot.

A traffic type determines a maximum number of time slots per time division multiplex frame. For example, in the preferred embodiment of this invention, a first traffic type may use one time slot per frame, and a second traffic type may be selected to use up to 8 time slots per frame. A plurality of control bits, being two control bits in this example, are broadcast in a downlink for controlling contention among the first traffic type subscriber units, contention among the multiple time slot subscriber units, and between first and second traffic type subscriber units. The two control bits indicate ownership of the time slots. In this example, the control bits have the following four digital values:

00, indicating that a current time slot is available for contention requests;

01, indicating that the current time slot is owned by a single time slot subscriber unit;

10, indicating that the current time slot is owned by the multiple time slot subscriber unit that sent a channel request in this time slot; and 11, indicating that the current time slot is owned by a multiple time slot subscriber unit that sent the channel requested in a different time slot.

Further, a set of control bits is sent in an uplink indicating whether a packet segment transferred in each time slot is part of a packet transmitted by a single slot user or a multiple slot user. A base site, typically a radio port, contention scheme differentiates between single time slot channel requests and multiple time slot channel requests and sets the two control bits in the downlink accordingly. A subscriber unit contention scheme, executed by the subscriber unit, provides for contention for channel access, and upon the subscriber unit obtaining channel access, allows a single time slot user to transmit on a same time slot that was won in the contention and allows a multiple time slot user to transmit on all time slots designated for the multiple time slot user, as is described in more detail below.

An uplink packet is typically divided into one-slot segments. For a multiple time slot packet, i.e., an N of N packet, N a positive integer, a first byte of the non-header segment is used as the segment number. For a single time slot packet, i.e., a 1 of N packet, transmitted segments are acknowledged via a Stop-and-Wait automatic acknowledgment scheme. Thus, only one bit sequence number is needed. This one bit sequence number is accomplished through the use of even and odd segments. The subscriber unit alternately marks a new segment as odd or even. In the event that an uplink segment is correctly received by the base site, but the downlink time slot in the following frame is not decoded by the subscriber unit, the subscriber unit retransmits the old segment and the base site identifies and discards the duplicate segment by identifying that its segment type (odd or even) is identical to that of the original.

FIG. 4, numeral 400, is a flow chart of another embodiment of steps of a method for controlling time slot contention to provide fairness between a plurality of types of subscriber units communicating with a base site in a time division multiplex communication system in accordance with the present invention. The method includes the steps of: A) contending, by the plurality of types of subscriber units, on an idle packet time slot by transmission of a predetermined number of control bits (402); B) utilizing, by the base site, the predetermined number of control bits from the subscriber units to determine the type of subscriber unit to win contention and assigning the time slot to a winning subscriber unit in accordance with the determination wherein, where the winning subscriber unit is a multiple time slot user type, further assigning the remaining of the idle packet time slots (404); C) starting, by a base site control unit, at least a first supervisory counter timer to control a length of time that the winning subscriber unit holds the time slot without successful segment transmission (406); D) utilizing, by the base site, a predetermined number of control bits to broadcast to the plurality of types of subscriber units the type of subscriber unit currently assigned to the time slot (408); E) utilizing, by the winning subscriber unit, a predetermined number of control bits to determine a current status of the next time slot prior to transmitting (412); and F) transmitting, by the winning subscriber unit, a packet segment and recyling to step D until one of: a packet is completed and one supervisory counter timer expires (410).

FIG. 5, numeral 500, is a block diagram of one embodiment of a time division multiplex communication system for controlling time slot contention to provide fairness among transmissions for a plurality of traffic types of subscriber units in accordance with the present invention. The system includes a plurality of subscriber units (508, 514, . . . ) and a base site (502) that perform the steps set forth below in parallel. Each subscriber unit (508, 514, . . . )includes a transmission retry counter (510, 516, . . . ) and a random number selector (512, 518, . . . ). The transmission retry counter (510, 516) is utilized for storing a transmission retry count and, prior to transmission of a packet on an uplink, for inserting the retry count into a packet header together with a traffic type identifier. The random number selector (512, 518, . . . )is operably coupled to receive a spreading factor N and a channel bitmap from the base site and is utilized for randomly selecting a value between one and N for a wait time and converting the value of the wait time to a number of time slots for waiting until retransmission. A unique contention-based access control scheme is used by the base site for prioritizing transmissions of the subscriber units The base site (502) includes an averaging unit (504) and a comparing unit (506). The averaging unit (504) is used for receiving the transmissions of the packets from the subscriber units and for determining an average retry count for a predetermined time interval. The comparing unit (506) is operably coupled to the averaging unit (504) and is used for: A) where a number of packets received during a predetermined reception interval is greater than or equal to a predetermined number of packets, comparing the average retry count with a predetermined threshold value, and utilizing the unique contention-based access scheme to determine the spreading factor N, N an integer, and B)where the number of packets received during the predetermined reception interval is less than the predetermined number of packets, automatically increasing N by a predetermined increment number and inserting N in a downlink packet together with the channel bitmap, setting a predetermined number of control bits based on the traffic type of the subscriber unit in a downlink for controlling contention for time slots among the plurality of traffic types of packet traffic user subscriber units, and transmitting the downlink packet to the subscriber units.

The unique contention-based access scheme for determining the spreading factor N utilized by the time division multiplex communication system is typically the scheme described above and shown in FIG. 3. In a preferred embodiment the predetermined number of control bits is two and the control bits indicate four types of time slot ownership, where the four types are as described above.

Thus, a subscriber unit that desires to transmit a packet on the uplink first contends for the channel access. The subscriber unit monitors the downlink and locates a packet time slot by reading the slow channel. When a packet time slot is found, the subscriber unit determines a status of the channel before transmitting an initial access request, i.e., an uplink packet header, on that channel. A status of busy or idle bits is described herein as B/I. The subscriber unit transmits on the uplink time slot when the status is Idle (B/I=00) and, where the status is Busy (B/I≠00), waits a random period of time, R1. After transmitting the packet header, the subscriber unit reads the slow channel bits in the corresponding time slot of the next downlink packet frame to determine whether it has successfully gained access to the channel. Where the downlink WEI, i.e., word error indication, is zero and the ECHO bits are matched, the subscriber unit is allowed to continue where the B/I bits are 01 for a 1-of-N user, or 10 for a N-of-N user. Where the B/I bits are 11, the current time slot is assigned to another N-of-N user who has just won contention on another time slot prior to this time slot. Where a subscriber unit fails to seize the channel, i.e., one of: WEI≠0; uplink ECHO≠ downlink ECHO; B/I=00; and B/I= 11, the transmission process is halted and remains idle for a random amount of time, R2, before attempting to access the uplink again.

Where a subscriber unit successfully gains access to the channel, it continues to send packet segments and reads the WEI and ECHO bits on the downlink slow channel of the following frame to determine the result of each transmission. Where the WEI is set, the subscriber unit retransmits the segment. The base site, typically a radio port, maintains a busy status on the time slot until it receives the DISCONNECT segment, i.e., a last segment, of the packet. An 1-of-N user stays on the same time slot where it won the contention, while an N-of-N user may transmit on all the time slots designated for it, i.e., the time slots designated B/I=10 or 11. The transmission process is aborted where the ECHO bits do not match or the time slot is no longer a packet slot, or the time slot becomes idle.

FIG. 6, numeral 600, is a block diagram of one embodiment of a process organization for a radio port/base site in accordance with the present invention wherein the radio port/base site and the radio port control unit/base site control unit are separate units. This organizational diagram is provided for an overview of the implementation of the present invention. Thus, a more detailed description of the invention follows this paragraph. Upon subscriber unit initial uplink access (604) at a first subscriber unit SU (602) of a plurality of subscriber units, uplink packet transmission is executed by the subscriber unit (602). Where the subscriber unit is a single time slot user (606), the subscriber unit transmits a packet on 1 of N time slots per frame to the radio port/base site RP (610) as set forth with more particularity in FIGS. 10, 11, and 12. Where the subscriber unit is a multiple time slot user (608), the subscriber unit transmits a packet in a multiplicity of time slots per frame specified by the radio port/base site (610), as set forth with more particularity in FIGS. 13, 14, 15, and 16. The radio port/base site (610) is responsive to the subscriber units and to the radio port control unit/base site control unit, performs uplink processing (612) as described with more particularity with respect to FIGS. 18 and 19, and performs downlink processing (614) as described with more particularity with respect to FIG. 20. The radio port control unit/base site control unit RPCU (616) provides processing (618) of each time slot of data or segment of data received from the radio port/base site, as described with more particularity with respect to FIG. 21.

FIG. 7, numeral 700, is a block diagram of a time division multiplex communication system for controlling time slot contention to provide fairness among transmissions for a plurality of traffic types of subscriber units in accordance with the present invention. The radio port control unit/base site control unit (702) includes supervisory counters (704), i.e., timers, that control a length of time that a subscriber unit holds a time slot. The radio port/base site (706) includes a time slot manager (708) for assigning the time slots to subscriber units in accordance with a time slot winner determination by a contention controller and the contention controller (710) for determination of the time slot winner in accordance with the unique contention-based access scheme of the present invention as described more fully above. The plurality of subscriber units includes at least one single time slot user, i.e., 1-of-N, having an ECHO bits generator (714) for generating ECHO bits that are used as described above and a transmission queue (716), Tx queue and a retransmission queue, ReTx queue (730), and at least one multiple time slot user, i.e., N-of-N, that includes a counter (720), and ECHO bits generator, a Tx queue (724), a retransmission queue/ReTx queue (726), and an acknowledgment queue/Ack queue (728). These elements are utilized as described herein.

FIG. 8, numeral 800, is a schematic drawing of an exemplary simplified TDMA frame structure that contains 8 time slots and shows a typical uplink packet structure. The subscriber unit transmits on the uplink and receives on the downlink. A devoted out-of-band signaling channel such as the slow channel in a Personal Communications System, for example the PACS, (Personal Access Communication System), may be selected to be used for transmission of contention control bits, thereby maximizing bandwidth utilization on the fast channel. An in-band signaling channel such as the fast channel in PACS may be used for transmission of user information. The slow channel is a small portion of the PACS time slot which typically carries the control information such as time slot usage (802), echo bits (804), and access type (806). The fast channel is a larger portion of the PACS time slot which generally carries user information and a minimum amount of control information such as user identification, packet length and packet number. In the preferred embodiment the downlink slow channel bits typically include: PCI, packet channel bits that are used by the base site to indicate that a current time slot is a packet time slot; B/I, busy/Idle bits that are used by the base site to indicate the status of the uplink to all subscriber units; ECHO bits, bits that are generated randomly and transmitted by a subscriber unit on an uplink and echoed back by a base site to the subscriber unit on the downlink in the next frame; and WEI, a word error indication bit that is used by the base site to indicate to the subscriber units whether the uplink time slot in the previous frame was received correctly. The uplink slow channel bits typically include: PCI (802), packet channel indication bits that are used by the subscriber unit to indicate that the current time slot is a packet time slot; ECHO bits (804), bits that are generated randomly and transmitted by the subscriber unit on an uplink and echoed back by a base site to the subscriber unit on the downlink in the next frame; and SEG bits (806), bits that are used by the subscriber unit to indicate which type of segment is being transmitted. For example, SEG bits may be encoded as follows: 000 for a first segment of a 1-of-N packet; 001 for a middle odd segment of a 1-of-N packet; 010 for a middle even segment of a 1-of-N packet; 011 for a disconnect segment of a 1-of-N packet; 100 for a first segment of an N-of-N packet; 101 for a middle of an N-of-N packet; 110 for reserved; and 111 for a disconnect segment of an N-of-N packet.

FIG. 9, numeral 900, is a flow chart showing steps for one embodiment of an uplink initial access control scheme executed by a subscriber unit in accordance with the method of the present invention. In the idle mode a subscriber unit monitors the downlink for possible messages addressed to itself. Upon desiring to transmit a new packet (902), the subscriber unit reads the slow channel on a downlink time slot to determine whether it contains valid information, i.e., cyclical redundancy code (CRC)is successful (904) and the time slot is a packet time slot (906). Where the CRC is invalid or time slot is a non-packet time slot, the subscriber unit waits a first random period of time (908), R1 slots, before contending again on the same or a different time slot (904).

Where the CRC is valid and the time slot is a packet time slot, the subscriber unit reads the slow channel bits to determine the busy/idle, B/I, status of the time slot (910). Where the time slot is busy, the subscriber unit delays R1 time slots (908) and recycles to contending again on a new time slot (904). Where the channel is idle, the subscriber unit may transmit a request segment. The subscriber unit transmits a packet header (912) to request channel access, waits exactly one frame (914), and checks the downlink CRC again (916). The packet header contains information about the packet and the subscriber unit that sent it.

Where a cyclical redundancy code (CRC) fails, the subscriber unit delays R2 time slots (932), R2 a second random period of time, and recycles to determining the status on a new time slot (904). Where the cyclical redundancy code is successful, the subscriber unit determines whether the same time slot,i.e., the time slot where the subscriber unit transmitted on in the previous frame, is still a packet time slot (918). Where the time slot is no longer a packet time slot, the subscriber unit delays R1 time slots (908), and recycles to contending again on another time slot (904). Where the time slot is still a packet time slot, the WEI bit is checked (916) for collision detection. That is, where two or more subscriber units try to transmit request segments at the same time and the radio port/base site does not capture anyone's segment, i.e., there is a collision, the WEI bit in the next downlink is set equal to one; and where only one subscriber unit's segment is received correctly by the radio port/base site, the WEI bit in the next downlink is set equal to zero. Where the WEI bit is 1, the subscriber unit recycles to delaying R1 time slots (908). Where the WEI bit is 0, the subscriber unit checks for matching ECHO bits (922). That is, where a subscriber unit is sending an access request segment or a normal segment, it randomly assigns a number to an ECHO field. A typical ECHO field is three bits. The radio port/base site is required to echo this field back on the same time slot in the following frame of the downlink. All subscriber units that are transmitting check this field against their random number that was previously transmitted. Where the subscriber unit's random number is a non-match for the value in the ECHO field, then the subscriber unit waits another random period of time R2 time slots and contents again on a new time slot. The value of R1 and R2 are determined using a novel scheme described in FIGS. 1, 2, and 3.

Where the ECHO bits are matching and the subscriber unit is a single time slot user, the subscriber unit checks the B/I bits (928). Checking B/I bits confirms the result of the subscriber unit's channel access request. A value of 00 indicates that there was a collision and no subscriber unit is assigned to the time slot. A value of 11 indicates that the time slot will be reserved for another user as soon as next frame. Where the B/I bits≠01, the subscriber unit recycles to delaying R1 time slots and contends for channel access again as previously described. Where the B/I bits=01, the subscriber unit begins to transmit segments on the time slot. Where the ECHO bits are matching and the subscriber unit is a multiple time slot user, the subscriber unit checks the B/I bits (926). Where the B/I bits≠10, the subscriber unit recycles to delaying R1 time slots (908). Where the B/I bits=10, the subscriber unit begins to transmit segments using one or more idle time slot per frame.

FIGS. 10, 11, and 12 numeral 1000, 1100, and 1200 respectively, are a flow chart showing steps for one embodiment of an uplink packet transmission scheme executed by a single-slot subscriber unit in accordance with the method of the present invention. The subscriber unit, after gaining access to the channel (930), checks the B/I bits (1002) to determine whether the time slot is busy, i.e., B/I=01. Where the B/I bits≠01, the subscriber unit aborts the transmission and recycles to delaying R1 time slots (908) as previously described. Where the B/I bits=01, the subscriber unit begins to transmit segment on the time slot (1004). The segment transmission process, shown in FIG. 12, works as follows: all segments of a packet are intially stored in the transmission queue, Tx queue. The ReTx is initially empty. The subscriber unit first checks the retransmission queue, ReTx queue (1202). Where the ReTx queue is non-empty, segment at the front of the ReTx queue is transmitted (1206). Where the ReTx is empty and the Tx queue is non-empty, the subscriber unit transmits a segment at the front of the Tx queue (1208) and moves the segment to the ReTx queue (1210). Where both the ReTx and Tx queues are empty, the subscriber unit begins to transmit DISCONNECT segment (1024) as shown in FIG. 11 and described later.

After transmitting a segment, the subscriber unit waits exactly one frame (1006) and reads/decodes the downlink time slot (1010),i.e., the time slot where the subscriber unit transmitted on in the previuos frame. Where the downlink time slot is error-free, i.e., a CRC is successful, the subscriber unit checks the PCI bits to determine whether the time slot is still a packet slot (1014). Where the time slot is a non packet time slot, the subscriber unit delays R1 time slots (908) and proceeds as previously described. Where the time slot is still a packet time slot, the subscriber unit checks the WEI bit (1008). The WEI bit on the downlink indicates whether the uplink segment on the previous frame was received correctly by the base site/radio port. Where the WEI bit is 1, i.e., the previous transmitted segment was received incorrectly, the subscriber unit proceeds to check the B/I status (1002) in order to transmit the same segment again,i.e., the segment which is still in the ReTx queue. Where the WEI is 0, the subscriber unit compares ECHO bits (1020), and where there is a non-match, delays R1 time slots (908) and proceeds as previously described. Where the ECHO bits match, the subscriber unit discards the segment in the ReTx queue and proceeds to check the B/I status in order to transmit a new segment.

Where the downlink time slot contains error, i.e., the CRC is invalid, the subscriber unit skips transmitting on the current time slot and waits exactly one frame (1008) and recycles to decode the downlink again until the CRC is valid. The subscriber unit then determines whether the time slot is still a packet slot (1016). Where the time slot is a non packet time slot, the subscriber unit delays R1 time slots (908) and proceeds as previously described. Where the time slot is still a packet time slot, the subscriber unit proceeds immidiately to checking the B/I status in order to transmit a segment without checking the previous transmission result since the subscriber unit did not transmit in the last frame.

Where both the ReTx queue and the Tx queue are empty when it is time to transmit a segment (1024), the subscriber unit transmits a DISCONNECT segment (1102), waits exactly one frame (1104), and decodes the downlink. The subscriber unit recycles to transmitting DISCONNECT segment until one of: a CRC is invalid (1106), the CRC is valid but the time slot becomes non packet slot (1108), and the CRC is valid and the time slot is still a packet and the WEI is 0 (1110). Where one of these events occurs the subscriber unit completes the uplink packet transmission (1112)

Figure 14:
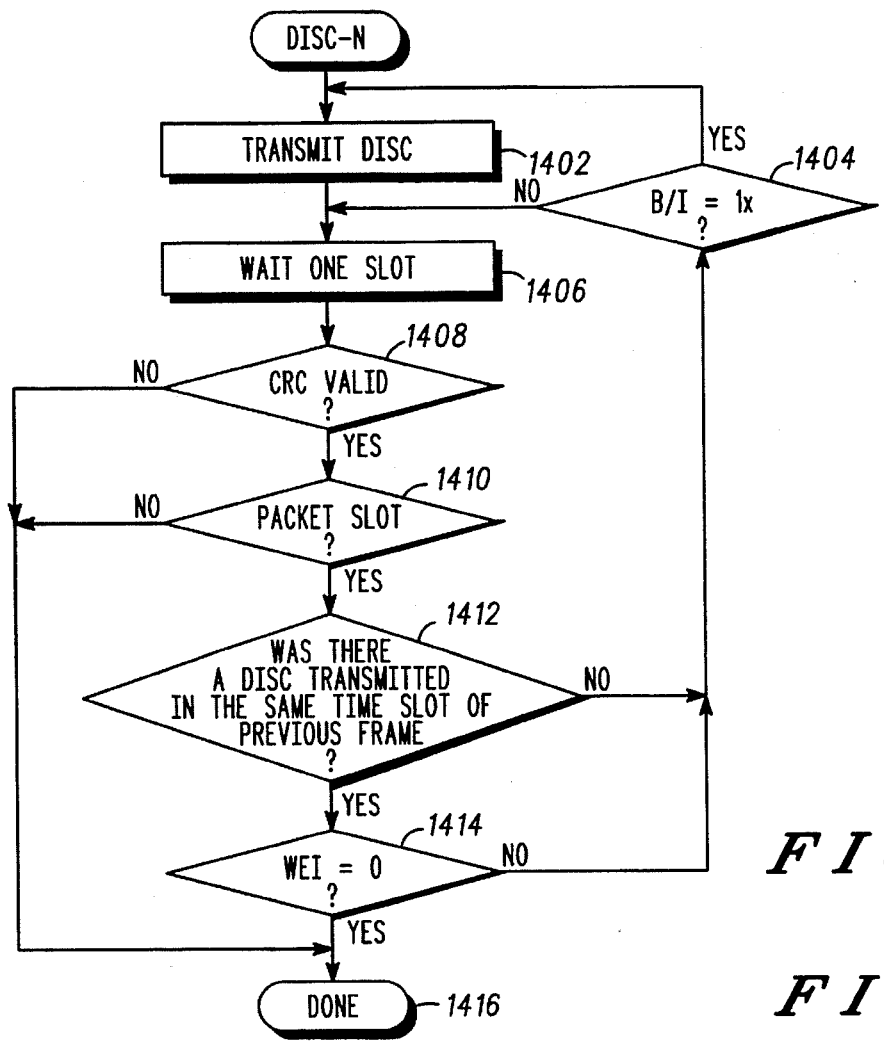
Figure 15:
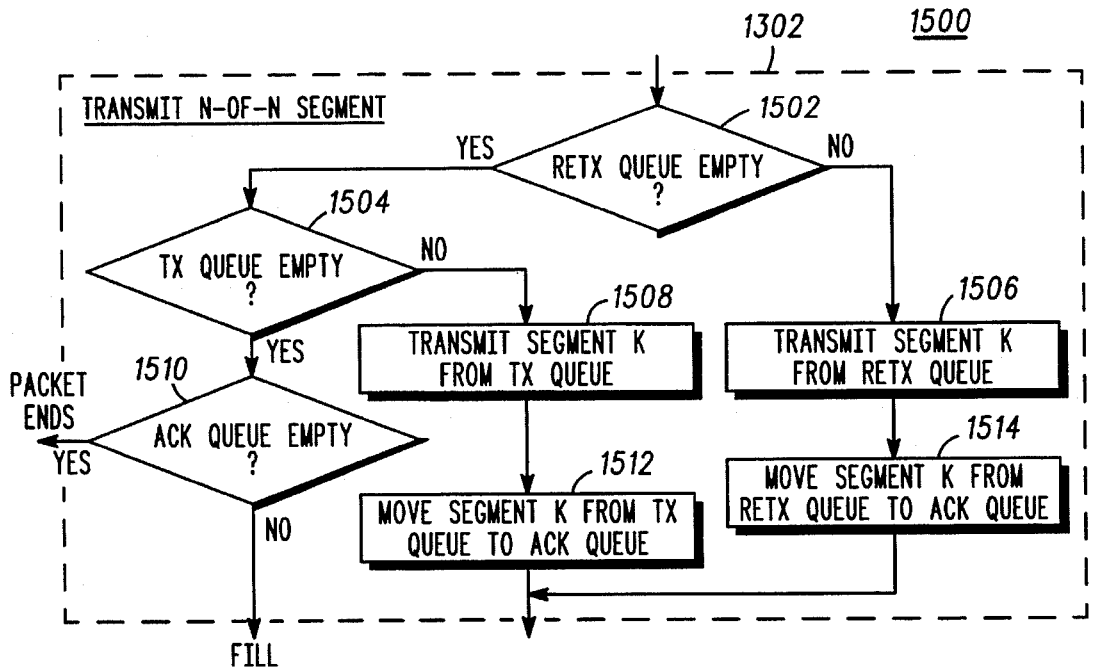
Figure 16:
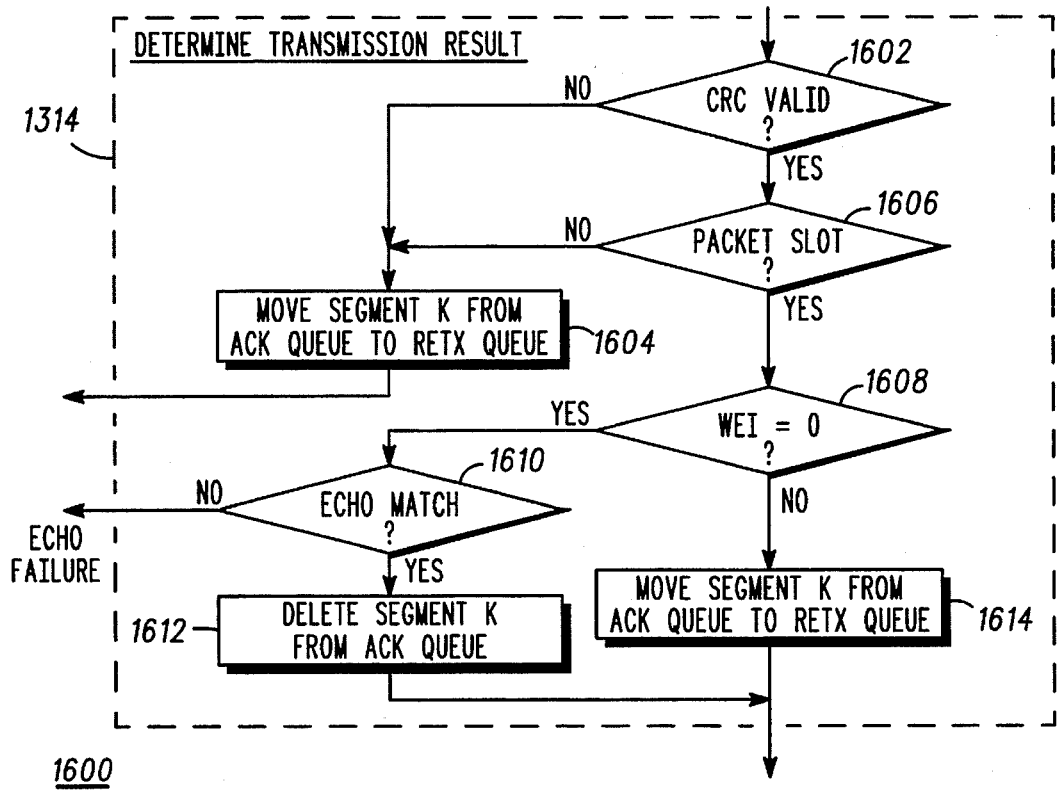

FIGS. 13, 14, 15, and 16, numeral 1300, 1400, 1500, and 1600 respectively, are a flow chart showing steps for one embodiment of an uplink packet transmission scheme executed by the multi-slot subscriber unit in accordance with the method of the present invention. Each subscriber unit of the multi-slot subscriber unit traffic type has three data queues: a transmission, Tx, queue: for storing segments of the original packet without the DISCONNECT segments; a retransmission, ReTx, queue for storing segments awaiting to be retransmitted; and an acknowledgment queue, Ack queue, for storing the segments which are waiting for acknowledgment.

Where the subscriber unit successfully gains access to the uplink (932), the subscriber unit begins to transmit packet segment (1302). The ReTx queue is checked (1502) to determine whether there is a segment to retransmit. Where there is a segment to retransmit, i.e., the ReTx queue is non empty, the subscriber unit transmits a segment at the front of the ReTx queue (1506) and moves the segment from the ReTx queue to the Ack queue (1 514). Where the ReTx queue is empty, the subscriber unit checks the Tx queue to determine whether there is a new segment to transmit (1504). Where there is a new segment to transmit, i.e., the Tx queue is non empty, the subscriber unit transmits a segment at the front of the Tx queue (1508) and moves the segment from the Tx queue to the Ack queue (1512). Where both the ReTx queue and the ReTx queue are empty and the Ack queue is non empty, the subscriber unit transmits a "fill" segment. Where both the ReTx queue and the ReTx queue are empty and the Ack queue is also empty, the subscriber unit proceeds to transmitting DISCONNECT segment (1304) as shown in FIG. 14 and is described below.

Where a normal segment (1302) or a "fill" segment (1306) was transmitted, the subscriber unit waits until the beginning of the next time slot (1308) to determine the transmission result of the segment sent in the current time slot of the previous frame. Where no segment was transmitted in the current time slot of the previous frame, the subscriber unit performs CRC check (1312) and determines whether the current time slot is still a packet time slot (1316). Where the CRC is invalid, or the CRC is valid but the time slot becomes a non packet time slot, the subscriber unit recycles to waiting until the next time slot. Where the CRC is valid and the time slot is still a packet time slot, the subscriber unit proceeds to checking the B/I bits (1320). Where there was a segment, k, transmitted in the current time slot of the previous frame, the subscriber unit determines transmission result and performs neccessary actions (1314) as shown in FIG. 16 and is described in the following: The subscriber unit performs CRC check (1602) and determines whether the current time slot is still a packet time slot (1606). Where the CRC is invalid, or the CRC is valid but the time slot becomes a non packet time slot, the subscriber unit moves segment k from the Ack queue to the ReTx queue (1604) and recycles to waiting until the next time slot (1308). Where the CRC is valid and the time slot is still a packet time slot, the subscriber unit checks the WEI bit (1608) and the ECHOs (1610). Where the WEI is 1, the subscriber unit moves segment k from the Ack queue to the ReTx queue (1614) and proceeds to checking the B/I bits (1320). Where the WEI is 0 and the ECHOs match, the subscriber unit deletes segment k from the Ack queue (1612) and proceeds to checking the B/I bits (1320). Where the WEI is 0 and the ECHOs are non match, the subscriber unit aborts the transmission (1318) and proceeds to delay R1 slot (908) as previously described.

The subscriber unit checks the B/I (1320) to determine whether the time slot is reserved for it. Where the B/Is are either '00' or '01', i.e., B/I≠1x, the subscriber unit proceeds to the next time slot (1308). Where the B/I bits are either '10' or '11', i.e., B/I=1x, the subscriber unit recycles to transmitting a new segment (1302).

Where the ReTx queue, the ReTx queue, and the Ack queue are all empty, the subscriber unit transmits a DISCONNECT segment (1402), waits until next time slot (1406), and decodes the downlink (1408). Where the CRC is invalid, or the CRC is valid but the time slot becomes a non packet time slot, the subscriber unit finishes the packet transmission. Where the CRC is valid and the time slot is still a packet time slot, the subscriber unit determines whether there was a DISCONNECT segment transmitted in the same time slot of the previous frame (1412). Where there was no DISCONNECT segment transmitted in the same time slot of the previous frame, the subscriber unit proceeds to check the B/I bits (1404). Where there was a DISCONNECT segment transmitted in the same time slot of the previous frame. the subscriber unit checks the WEI bit (1414) to determine the transmission result. Where the WEI is 0, the subscriber unit finishes the packet transmission (1416). Where the WEI is 1, the subscriber unit proceeds to check the B/I bits (1404). Where the B/Is are either '00' or '01', the subscriber unit proceeds to the next time slot (1406). Where the B/I bits are either '10' or '11', i.e., B/I=1x, the subscriber unit recycles to transmitting another DISCONNECT segment (1402).

FIG. 17, numeral 1700, is a schematic showing, for a block diagram of elements operating in accordance with the present invention, one implementation of slow channel bits and variables exchanged between a subscriber unit, a radio port and a radio port control unit in accordance with the present invention. The subscriber unit (1702) sends a segment (1708) that includes PCI bits, ECHO bits, and SEG bits and receives from the radio port a segment (1710) that includes PCI bits, ECHO bits, B/I bits, and a WEI bit. The radio port (1704) sends a segment (1712) that includes PCI bits, B/I bits, SEG bits, and a WEI bit and receives from the radio port control unit (1706) a segment (1714) that includes PCI bits and a plurality of control bits, C0, C1, C2.

FIG. 18, numeral 1800, and FIG. 19, numeral 1900, show a flow chart for steps in one embodiment for an uplink processing scheme in accordance with the method of the present invention. The uplink processing scheme is executed by the radio port/base site, hereafter referenced as the radio port, RP, upon receiving an uplink segment from a subscriber unit (1802). The RP checks a variable M_PCI to determine whether a current time slot is a packet slot (1804). This packet channel indication variable was set when the RP executed a downlink algorithm. Where the slot is not a packet slot, no action is taken by the RP. Where the slot is a packet slot, the RP checks whether there is an N-of-N user currently using the channel (1806). This event is indicated by the variable N-of-N flag. Typically, where there is an N-of-N user using the channel, the N-of-N flag is one, and the RP determines whether the time slot is idle (1808), i.e., typically whether M_B/I=00. Where the N-of-N flag is one and the time slot is idle, i.e., M_B/I=00, the RP sets the M_B/I variable to 11 (1810). Where the N-of-N flag is zero and the B/I status is either 10 or 11 (1820), the B/I status is set to idle (1818), i.e., M_B/I=00. The RP then determines whether a CRC check is valid (1812). Where the CRC check is invalid (1812), the RP the variable M_WEI is set to one (1814) and a one is stored in a WEI$_p$ field (1816). Then the RP delivers an uplink segment to the radio port control unit/base site control unit (1916).

Where the CRC check is valid (1812), the RP determines a whether the variable M_B/I is equal to 00 (1902), proceeding as set forth in FIG. 19. Where the channel is idle, i.e., M_B/I=00, the RP checks the SEG$_A$ to determine whether the uplink slot is a first time slot of a packet (1904), i.e., a first two bits of SEG$_A$ equal 00. This is the only type of uplink time slot that is permitted when the channel is idle. The RP determines whether an N-of-N flag is set (1906). Where the N-of-N flag is clear, the RP determines whether the time slot is from a 1-of-N user or a from a N-of-N user (1908), i.e., whether SEG$_A$=0 xx. Where the time slot is from a 1-of-N user, the B/I bits are set to 01 (1910), i.e., are set to indicate busy. Where the time slot is from a N-of-N user, the B/I bits are set to 10 to indicate the time slot is busy and the N-of-N flag is set to one (1912). Where, after the RP determines that the CRC check is valid, the variable M_B/I is unequal to 00 (1902), the RP determines whether SEG$_A$ equals x00 (1918). Where SEG$_A$ equals x00, a one is stored in a WEI$_p$ field (1816), and the RP delivers an uplink time slot to the radio port control unit/base site control unit (1916). Where the SEG$_A$ is unequal to x00, the RP determines whether SEG$_A$ equals x11 (1920). Where SEG$_A$ is equal to x11 (1920), the RP determines whether SEG$_A$ equals 0xx (1922). Where SEG$_A$ equals 0xx, the variable M_B/I is set to 00 (1926), i.e., is set to idle. Where SEG$_A$ is unequal to 0 xx, the N-of-N flag is set to zero (1924) and the variable M_B/I is set to 00 (1926), i.e., is set to idle. The ECHO bits received in the variable M_ECHO are saved, the M_WEI variable is set to zero, the segment packet SEG$_P$ is updated to SEG$_A$, the B/I$_P$ packet bits are updated to B/I$_A$ and N/N$_P$ is set to the N-of-N flag (1914). The states of the B/I bits and the N-of-N flag are sent to the radio port control unit/base/site when the RP delivers the uplink time slot to the radio port control unit/base site (1916). Where the RP is expecting a first time slot of a packet and the uplink time slot is not a first time slot of a packet, or the RP is expecting a non-first time slot of a packet and the time slot is a first time slot of a packet (1904 and 1918), the RP processes the packet as if the packet had failed the CRC check.

The RP maintains a busy status of the uplink channel as long as the disconnect segment, SEG$_A$=x11, is not received. Where the disconnect segment is received, the RP sets the M_B/I variables equal to 00 to indicate that the uplink is idle.

FIG. 20, numeral 2000, is a flow chart for one embodiment of a downlink processing scheme executed by a radio port in accordance with the present invention. The steps of this method are executed whenever a downlink time slot is received from the radio port control unit/base site to be transmitted (2002). The RP determines whether $PCI_P$ bits indicate that the slot is a packet slot (2004). Where the $PCI_P$ bits indicate that the slot is not a packet slot, the RP inserts the WEI bit computed from the same time slot in the previous uplink frame (2018) and broadcasts the downlink time slot to the subscriber units (2020). Where the $PCI_P$ bits indicate that the slot is a packet slot, the RP determines whether a control bit C2 is set to one (2006). Where C2 is set to 1, an N-of-N flag is set to zero (2008). The RP then determines whether other control bits, C0 and C1, are set to 01 (2010). Where C0 and C1, are set to 01, the RP stores 00 in the M_B/I (2014). Where C0 and C1, are set to 10, the RP stores 01 in the M_B/I (2012). The $B/I_A$ bits from the previous uplink transmission are saved in the M_B/I variable and the M_PCI bits are updated to packet bits (2016). Then the RP inserts the WEI bit computed from the same time slot in the previous uplink frame (2018) and broadcasts the downlink time slot to the subscriber units (2020).

FIG. 21, numeral 2100, is a flow chart for one embodiment of an uplink processing scheme executed by a radio port control unit in accordance with the present invention. Typically, the radio port control unit/base site control unit, i.e., RPCU, maintains an individual counter, Dcounter, for each TDMA time slot, and a common counter, Ncounter, for all the TDMA time slots. Upon receiving a slot or segment from the radio port/base site (2102), the RPCU first determines whether the current time slot is a packet slot (2106), i.e., whether $PCI_P$ equals packet. Where the current time slot is not a packet slot, Ncounter is incremented by one (2108). Where the current time slot is a packet slot, the RPCU determines whether a CRC check is valid (2110), i.e., whether $WEI_P$ is equal to zero. Where $WEI_P$ is equal to zero (2110), the RPCU copies the values of the B/I bits and the N/N bits into the variables Busy and Nflag, respectively (2104), the Dcounter is set equal to 0 (2118), and the RPCU determines whether a most significant bit of the segment $SG_P$ is zero (2120), i.e., whether $SG_P=0$ xx. Where the most significant bit of the segment $SG_P$ is zero, Ncounter is incremented by one (2122). Where $WEI_P$ is unequal to zero (2110), the RPCU determines whether the channel is busy (2112). Where the channel is busy (2112), Dcounter is incremented by one (2114) and Ncounter is set to zero (2124). Where the channel is idle (2112), Dcounter is set to zero (2121) and Ncounter is set to zero (2124). Upon the Ncounter being set to zero or one (2124, 2108, 2122), the RPCU determines whether the Dcounter has exceeded its maximum value (2126). Where the Dcounter has exceeded its maximum value, control bits C0 and C1 are set to 01 (2130). Where the Dcounter has not exceeded its maximum value, control bits C0 and C1 are set to 00 (2128). After setting the control bits C0 and C1 (2128, 2130), the RPCU determines whether the Ncounter is greater than or equal to the number of time slots per TDMA frame (2132), i.e., 8. Where the N counter is greater than or equal to the number of time slots per TDMA frame, the RPCU determines whether an Nflag is set to one (2134). Where the Nflag is set to one, the control variable C2 is set to one (2136) and the RPCU inserts C2, C1, and C0 into the slow channel of the corresponding time slot on the next downlink frame (2140). Where the Nflag is not set to one, the control variable C2 is set to zero (2138) and the RPCU inserts C2, C1, and C0 into the slow channel of the corresponding time slot on the next downlink frame (2140).

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

Throughout the description above "x" means a "don't care" bit, as is commonly understood.

We claim:

1. A method for controlling contention for a plurality of idle time slots, at a base site, to provide fairness between a plurality of types of subscriber units in a time division multiplex communication system, comprising the steps of:

A) contending, by the plurality of types of subscriber units, on an idle packet time slot by transmission of a predetermined number of control bits; and B) utilizing, by the base site, the predetermined number of control bits from the subscriber units and supervisory counter bits generated at the base site in accordance with a scheme to determine allocation of the time slot, and where the subscriber unit uses multiple time slots, to determine allocation of remaining idle packet time slots, wherein the predetermined number of control bits include echo bits and traffic type identification bits, and wherein number of traffic type identification bits is at least two and the traffic type identification bits indicate at least four types of time slot ownership in accordance with a predetermined contention scheme.

2. The method of claim 1 wherein the four types of time slot ownership are:

A) a current time slot is available for contention requests;

B) the current time slot is owned by a single time slot subscriber unit;

C) the current time slot is owned by the multiple time slot subscriber unit that sent a channel request in the time slot; and D) the current time slot is owned by a multiple time slot subscriber unit that sent a channel request in a different time slot.

3. A method for controlling contention for a plurality of idle time slots, at a base site, to provide fairness between a plurality of types of subscriber units in a time division multiplex communication system, comprising the steps of:

A) contending, by the plurality of types of subscriber units, on an idle packet time slot by transmission of a predetermined number of control bits; and B) utilizing, by the base site, the predetermined number of control bits from the subscriber units and supervisory counter bits generated at the base site in accordance with a scheme to determine allocation of the time slot, and where the subscriber unit uses multiple time slots, to determine allocation of remaining idle packet time slots, wherein the scheme to determine allocation of the time slot, and where the subscriber unit uses multiple time slots, to determine allocation of the remaining idle packet time slots comprises:

each subscriber unit performing the steps of:

A) utilizing a transmission retry counter for storing a transmission retry count and, prior to transmission of a packet on an uplink, inserting the retry count into a packet header together with a traffic type identifier, B) utilizing a random number selector for randomly selecting a value between one and a spreading factor N, where N, N an integer, and a channel bitmap are obtained from the base site, for a wait time and converting the value of the wait time to a number of time slots for waiting until retransmission, the base site control unit performing the steps of:

C) utilizing an averaging unit for receiving the transmissions of the packets from the subscriber units and for determining an average retry count for a predetermined time interval, D) utilizing a comparing unit for:

D1) where a number of packets received during a predetermined reception interval is greater than or equal to a predetermined number of packets, comparing the average retry count with a predetermined threshold value, and utilizing a contention-based access scheme to determine the spreading factor N, and D2) where the number of packets received during the predetermined reception interval is less than the predetermined number of packets, automatically increasing N by a predetermined increment number and inserting N in a downlink packet together with the channel bitmap, setting a predetermined number of control bits based on the traffic type of the subscriber unit in a downlink channel for controlling contention for time slots among the plurality of traffic types of packet traffic user subscriber units, and transmitting the downlink packet to the subscriber units.

4. The method of claim 3 wherein the unique contention-based access scheme for determining the spreading factor N comprises the steps of:

A) where the average retry count is greater than or equal to the predetermined threshold value plus a first predetermined constant, increasing N by a value equal to a predetermined percentage of the average retry count, B) where the average retry count is less than or equal to the predetermined threshold value minus a second predetermined constant, decreasing N by a predetermined decrease amount, and C) where the average retry count lies between the predetermined threshold value minus the second predetermined constant and the predetermined threshold value plus the first predetermined constant, maintaining a current value of N.

5. A method for controlling time slot contention to provide fairness between a plurality of types of subscriber units communicating with a base site in a time division multiplex communication system, comprising the steps of:

A) contending, by the plurality of types of subscriber units, on an idle packet time slot by transmission of a predetermined number of control bits;

B) utilizing, by the base site, the predetermined number of control bits from the subscriber units to determine the type of subscriber unit to win contention and assigning the time slot to a winning subscriber unit in accordance with the determination wherein, where the winning subscriber unit is a multiple time slot user type, further assigning remaining idle packet time slots;

C) starting, by a base site control unit, at least a first supervisory counter timer to control a length of time that the winning subscriber unit holds the time slot;

D) utilizing, by the base site, the predetermined number of control bits to broadcast to the plurality of types of subscriber units the type of subscriber unit currently assigned to the time slot;

E) utilizing, by the winning subscriber unit, a predetermined number of control bits to determine a current status of the next time slot prior to transmitting; and F) transmitting, by the winning subscriber unit, a packet segment and returning to step D until one of: a packet is completed and one supervisory counter timer expires.

6. A time division multiplex communication system for controlling time slot contention to provide fairness among transmissions for a plurality of traffic types of subscriber units, comprising:

A) a plurality of subscriber units having a plurality of traffic types, each subscriber unit including:

A1) a transmission retry counter for storing a transmission retry count and, prior to transmission of a packet on an uplink, inserting the retry count into a packet header together with a traffic type identifier, A2) a random number selector, operably coupled to receive a spreading factor N and a channel bitmap from a base site, for randomly selecting a value between one and N for a wait time and converting the value of the wait time to a number of time slots for waiting until retransmission, B) a base site having a contention-based access control scheme for prioritizing transmissions of the subscriber units including:

B1) an averaging unit, for receiving the transmissions of the packets from the subscriber units and for determining an average retry count for a predetermined time interval, B2) a comparing unit, operably coupled to the averaging unit, for:

where a number of packets received during a predetermined reception interval is greater than or equal to a predetermined number of packets, comparing the average retry count with a predetermined threshold value, utilizing the contention-based access scheme to determine the spreading factor N, N an integer, and where the number of packets received during the predetermined reception interval is less than the predetermined number of packets, automatically increasing N by a predetermined increment number, and inserting N in a downlink packet together with the channel bitmap, setting a predetermined number of control bits of the downlink packet based on the traffic type of the subscriber unit in a downlink channel for controlling contention for time slots among the plurality of traffic types of packet traffic user subscriber units, and transmitting the downlink packet to the subscriber units.

7. The time division multiplex communication system of claim 6 wherein the contention-based access scheme for determining the spreading factor N includes:

where the average retry count is greater than or equal to the predetermined threshold value plus a first predetermined constant, increasing N by a value equal to a predetermined percentage of the average retry count, where the average retry count is less than or equal to the predetermined threshold value minus a second predetermined constant, decreasing N by a predetermined decrease amount, and where the average retry count lies between the predetermined threshold value minus the second predetermined constant and the predetermined threshold value plus the first predetermined constant, maintaining a current value of N.

8. The time division multiplex communication system of claim 6 wherein the predetermined number of control bits is two and the control bits indicate four types of time slot ownership.

9. The time division multiplex communication system of claim 8 wherein the four types of time slot ownership are:

A) a current time slot is available for contention requests;

B) the current time slot is owned by a single time slot subscriber unit;

C) the current time slot is owned by the multiple time slot subscriber unit that sent a channel request in the time slot; and D) the current time slot is owned by a multiple time slot subscriber unit that sent a channel request in a different time slot.

* * * * *